United States Patent [19]

Brown

[11] Patent Number: 4,538,906

[45] Date of Patent: Sep. 3, 1985

[54] COPIERS FOR SIMPLEX AND DUPLEX COPYING

[75] Inventor: Ian G. Brown, Milton Keynes, England

[73] Assignee: Xerox Corporation, Stamford, Conn.

[21] Appl. No.: 617,420

[22] Filed: Jun. 5, 1984

[30] Foreign Application Priority Data

Jun. 8, 1983 [GB] United Kingdom ................. 8315727

[51] Int. Cl.[3] ........................ G03B 15/00; G03B 27/32

[52] U.S. Cl. ............................ 355/14 SH; 355/3 SH; 355/23; 355/24; 271/3.1; 271/301

[58] Field of Search .................. 355/3 SH, 14 SH, 23, 355/24, 3 R; 271/3.1, 4, 301, 279, 280, 186

[56] References Cited

U.S. PATENT DOCUMENTS

| | | | |
|---|---|---|---|
| 4,050,805 | 9/1977 | Hage | 355/14 |
| 4,136,862 | 1/1979 | Kunz et al. | 271/186 |
| 4,173,410 | 11/1979 | Tabata et al. | 355/24 |
| 4,190,354 | 2/1980 | Smith et al. | 355/3 SH |
| 4,191,465 | 3/1980 | Boase et al. | 355/3 SH |
| 4,272,180 | 6/1981 | Satomi et al. | 355/3 SH |
| 4,330,197 | 5/1982 | Smith et al. | 355/14 SH |
| 4,365,886 | 12/1982 | Murakami et al. | 355/3 SH |
| 4,487,506 | 12/1984 | Repp et al. | 355/14 SH |

*Primary Examiner*—A. C. Prescott

[57] ABSTRACT

A copier is described which is capable of simplex and duplex copying which includes a photoreceptor (11), first and second copy sheet trays (41 and 42) and a duplex buffer tray (43). A first sheet feeder (46) is associated with the first copy sheet tray (41) and a second sheet feeder (45) is commonly associated with the duplex buffer tray (43) and the second copy sheet tray (42). The trays (42, 43) are relatively movable for operatively associating them only one at a time with the second feeder (45). A control is provided for selecting sheet feeding from one of the copy sheet trays (41, 42) and further for controlling the trays such that during duplex copying copy sheets are fed only from the first copy sheet tray (41) and only the buffer tray (43) is operatively associated with the common sheet feeder (45).

3 Claims, 43 Drawing Figures

COPIERS FOR SIMPLEX AND DUPLEX COPYING

This invention relates to copiers capable of simplex or duplex copying and more particularly to such copiers which include a photoreceptor, first and second copy sheet trays, a duplex buffer tray, sheet feeders associated with said trays for feeding sheets from said trays towards the photoreceptor, sheet return means for conveying simplex sheets which have received an image on one side at the photoreceptor to the duplex buffer tray for refeeding to the photoreceptor to receive a second image on the other side, and means for selecting sheet feed from one of said copy sheet trays.

A copier of this general kind is described in British Pat. No. 2033878 which includes a photoreceptor (12), two copy sheet trays (106, 107) and a duplex buffer tray (116). Top sheet feeders are provided for the copy sheet trays (106, 107) and a bottom sheet feeder (124) is provided for the duplex buffer tray (116). In the embodiment illustrated the duplex buffer tray has a false bottom or upper support which enables additional sheets to be fed into the buffer tray beneath those already in the tray as a job recovery feature.

A copier according to the present invention is characterised in that a first sheet feeder is associated with the first copy sheet tray and a second sheet feeder is commonly associated with said duplex buffer tray and said second copy sheet tray, these trays being relatively movable for operatively associating said trays one at a time with said second, common sheet feeder, and means is provided for controlling said trays such that during duplex copying, copy sheets are fed from first copy tray and said buffer tray is operatively associated with said common sheet feeder.

In a preferred embodiment the second copy sheet tray is mounted for movement between a lowered, operative position in which it is seated within the duplex buffer tray and operatively associated with the second sheet feeder and a raised, inoperative position in which it is spaced over the duplex buffer tray and the latter is operatively associated with a second sheet feeder, the second copy sheet tray being in its raised inoperative position during duplex copying.

Suitably the first copy sheet tray is movable between an operative position engaged with its feeder and an inoperative position disengaged from its feeder, engagement of each of the first and copy sheet tray being inhibited unless the other of the trays is disengaged from its feeder.

Figure 1:
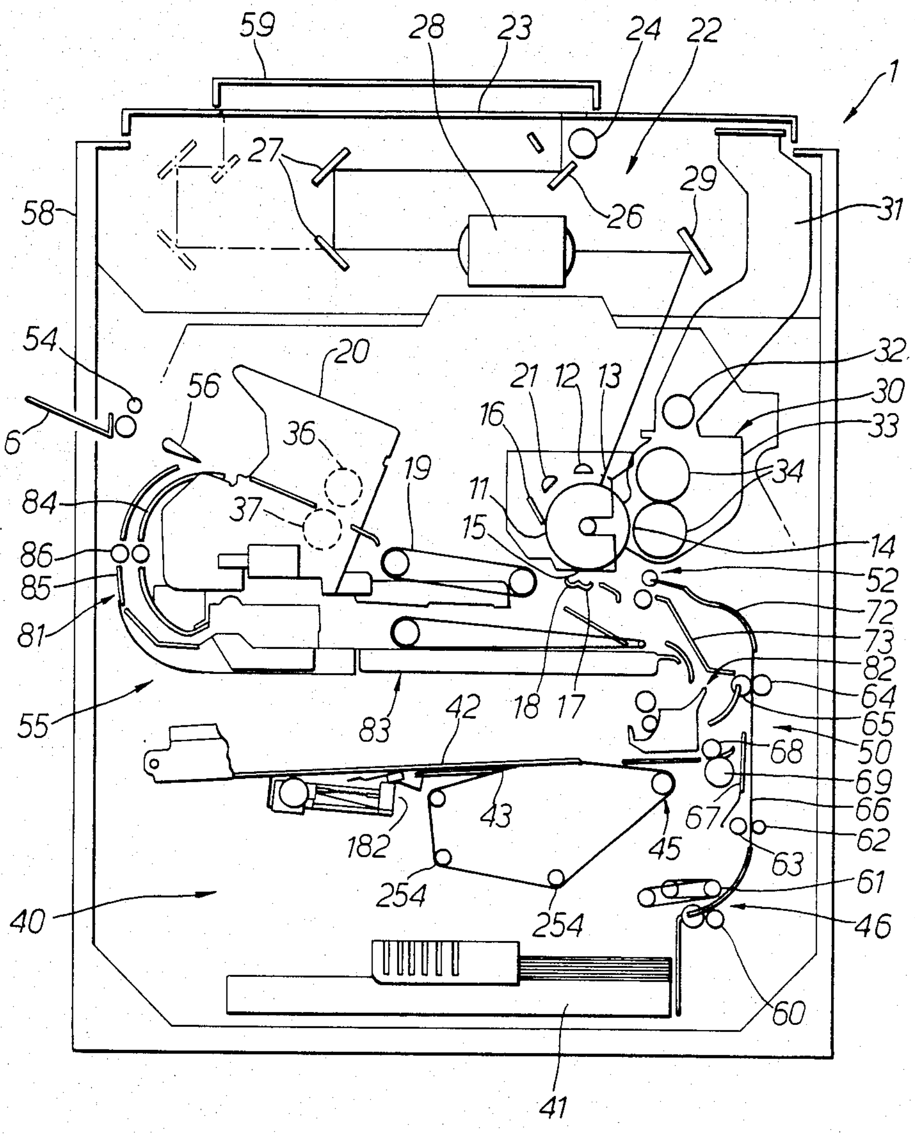
Figure 2:
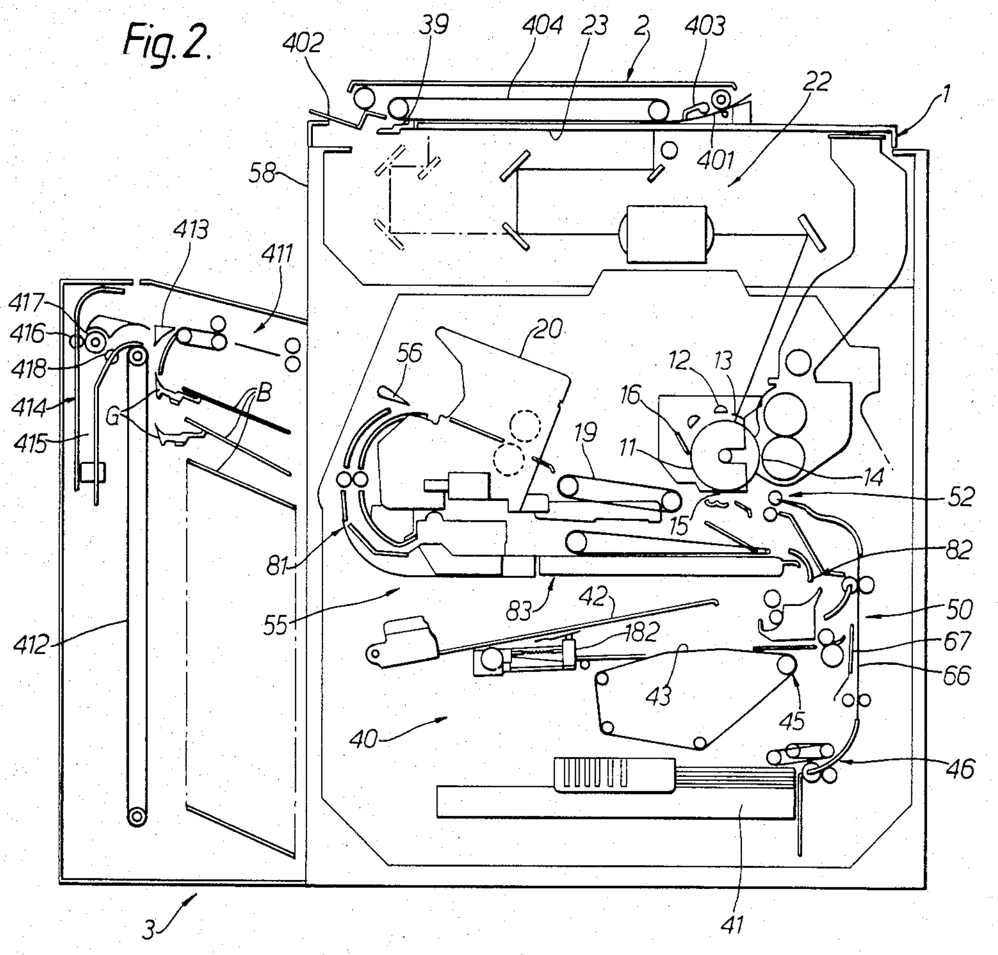
Figure 3:
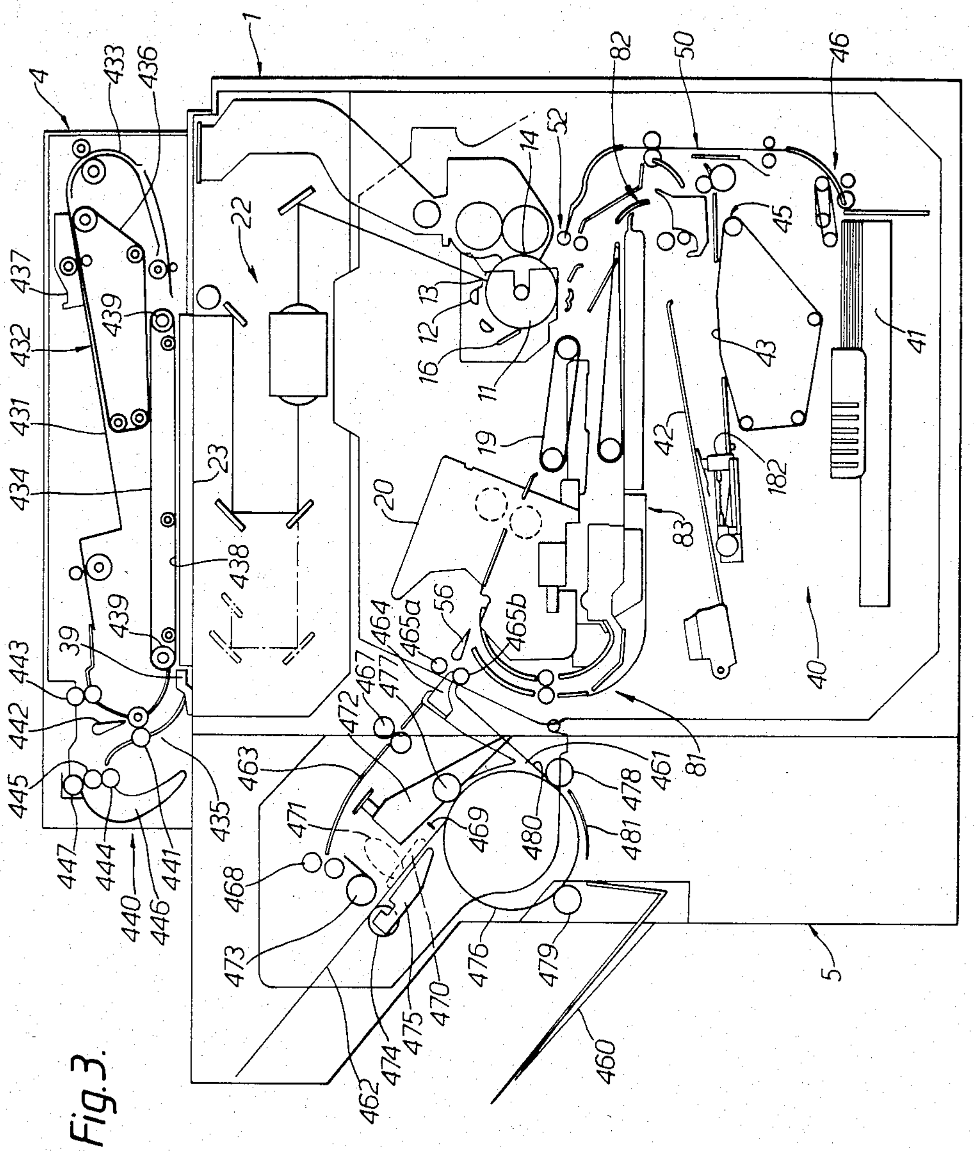
Figure 4:
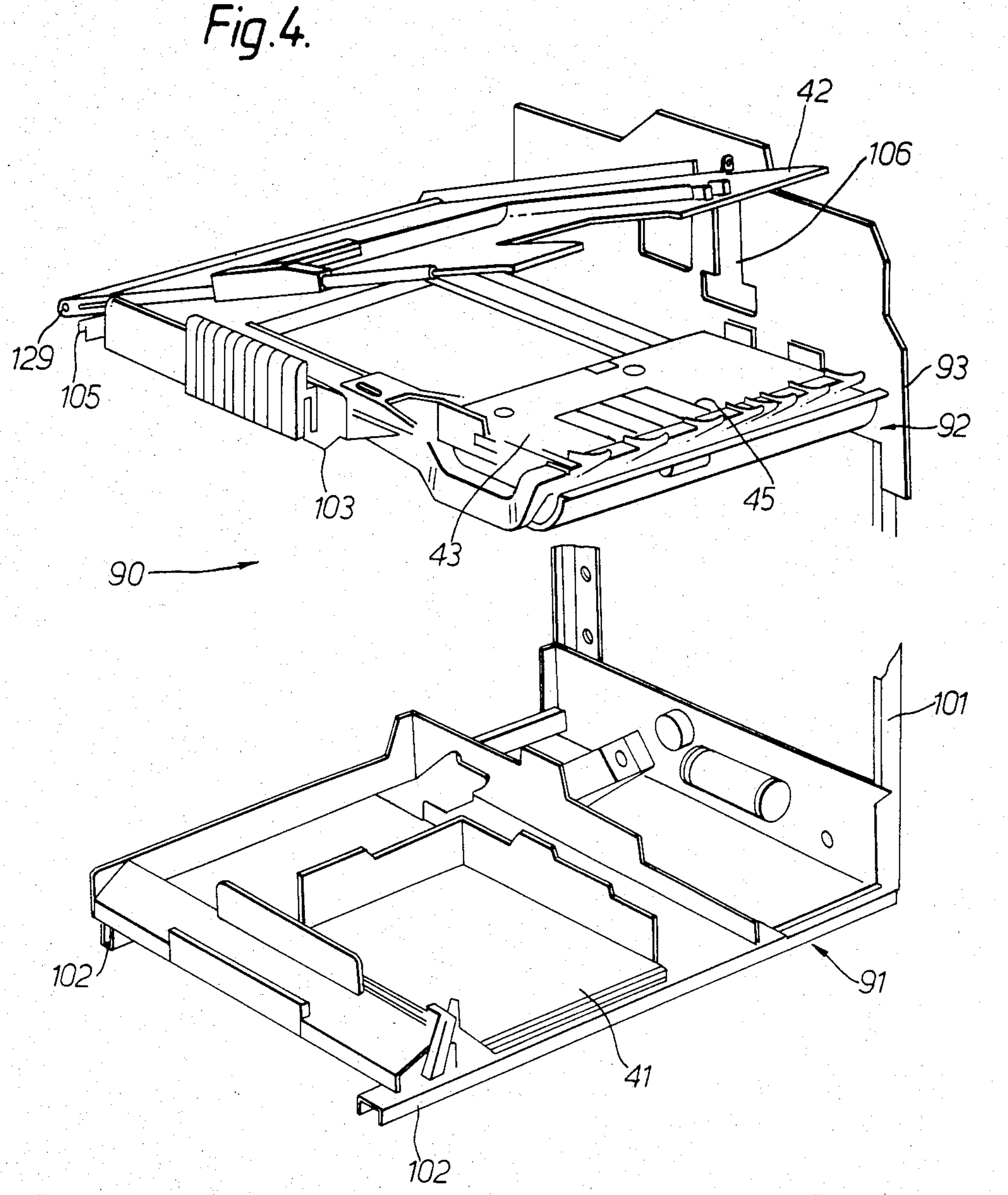
Figure 5:
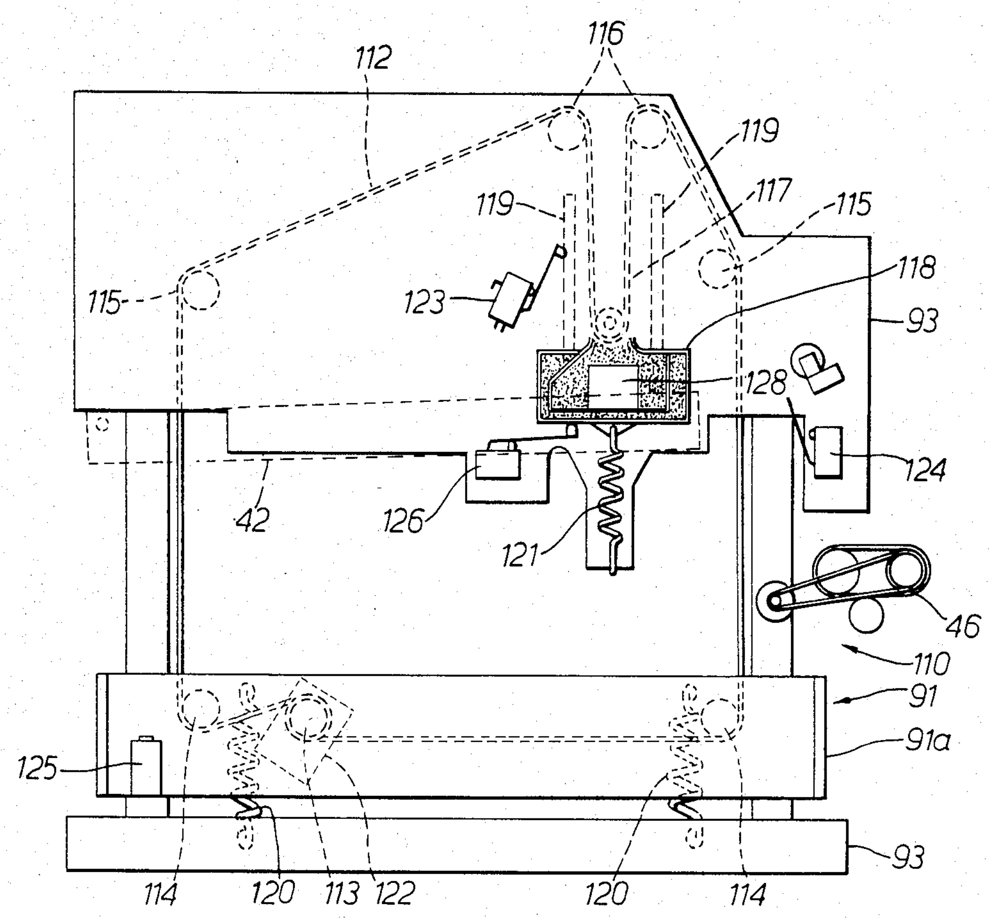
Figure 6:
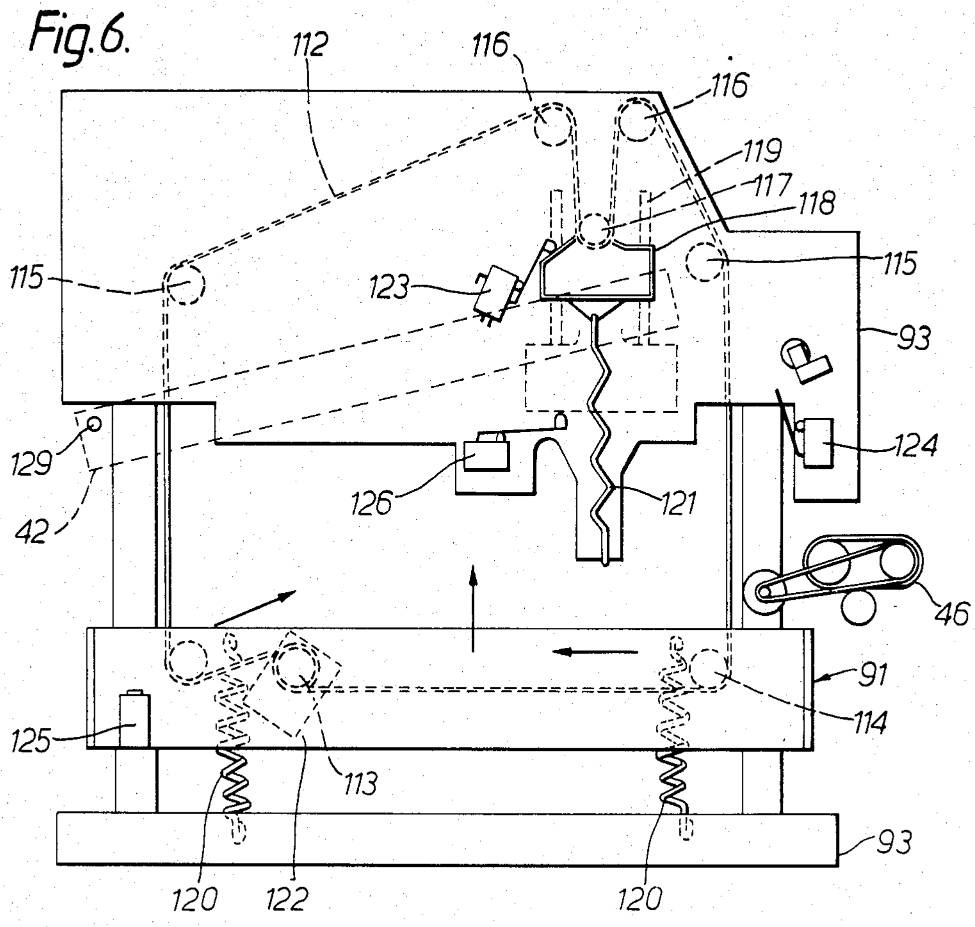
Figure 7:
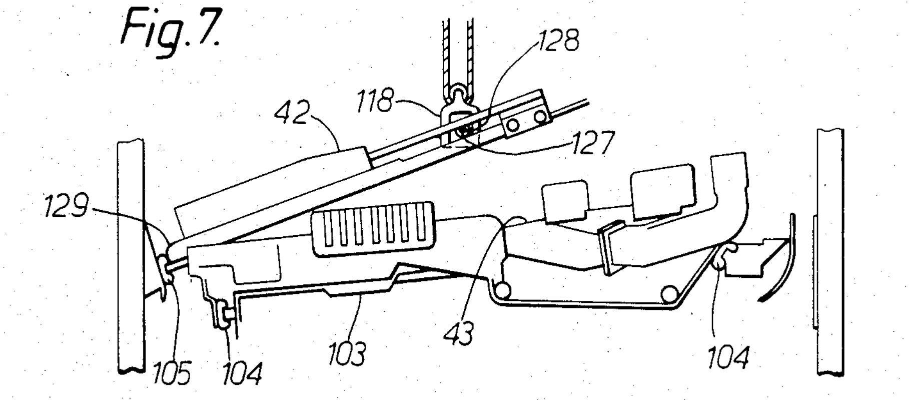
Figure 8:
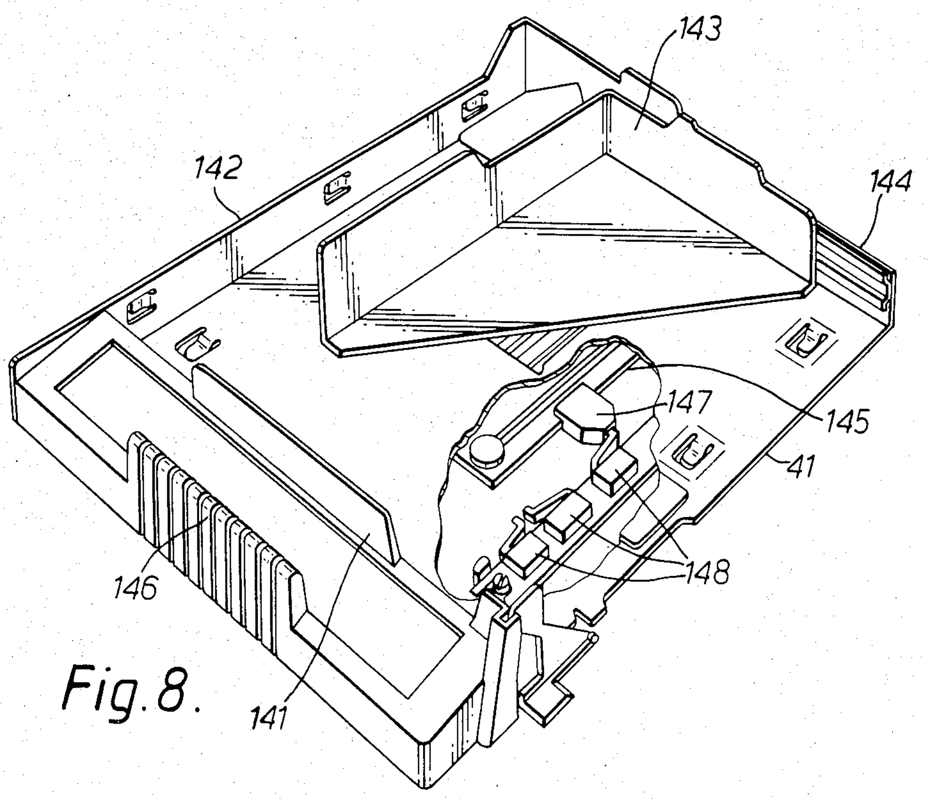
Figure 9:
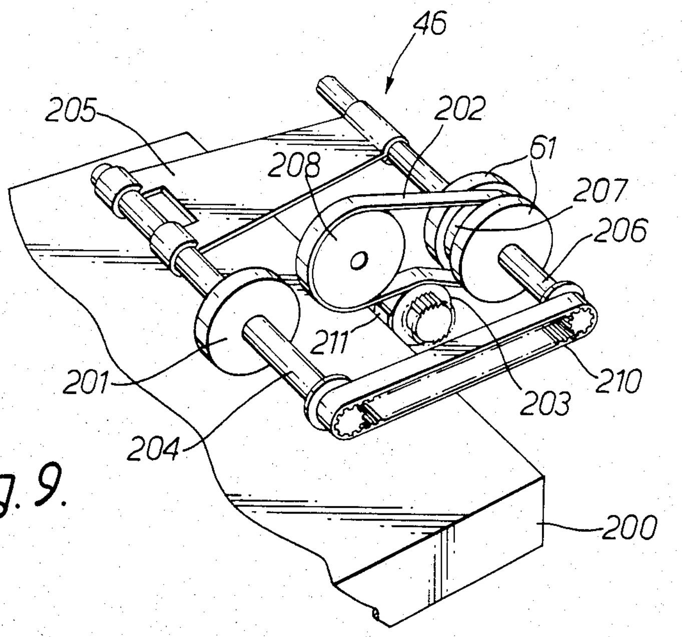
Figure 10:
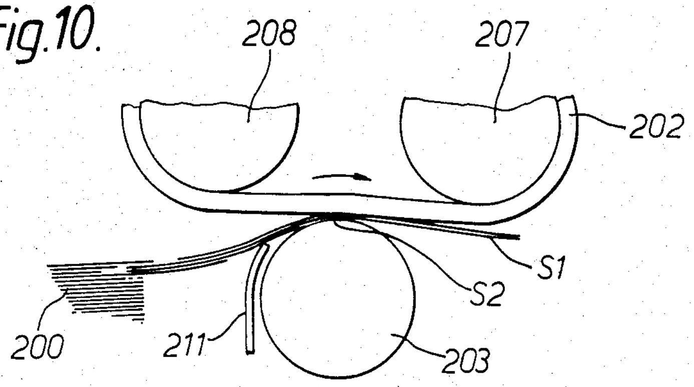
Figure 11:
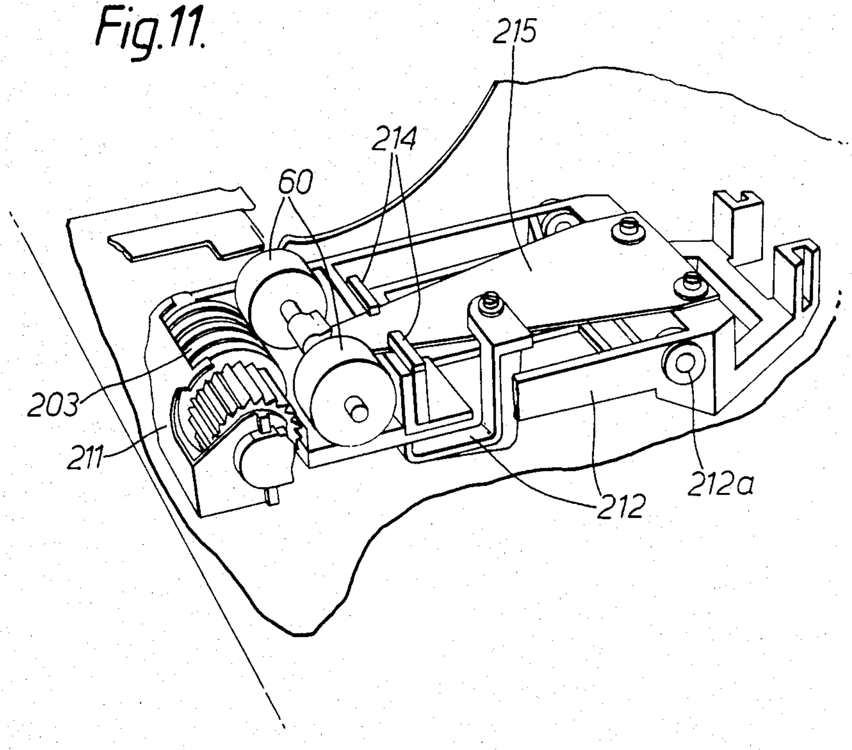
Figure 12:
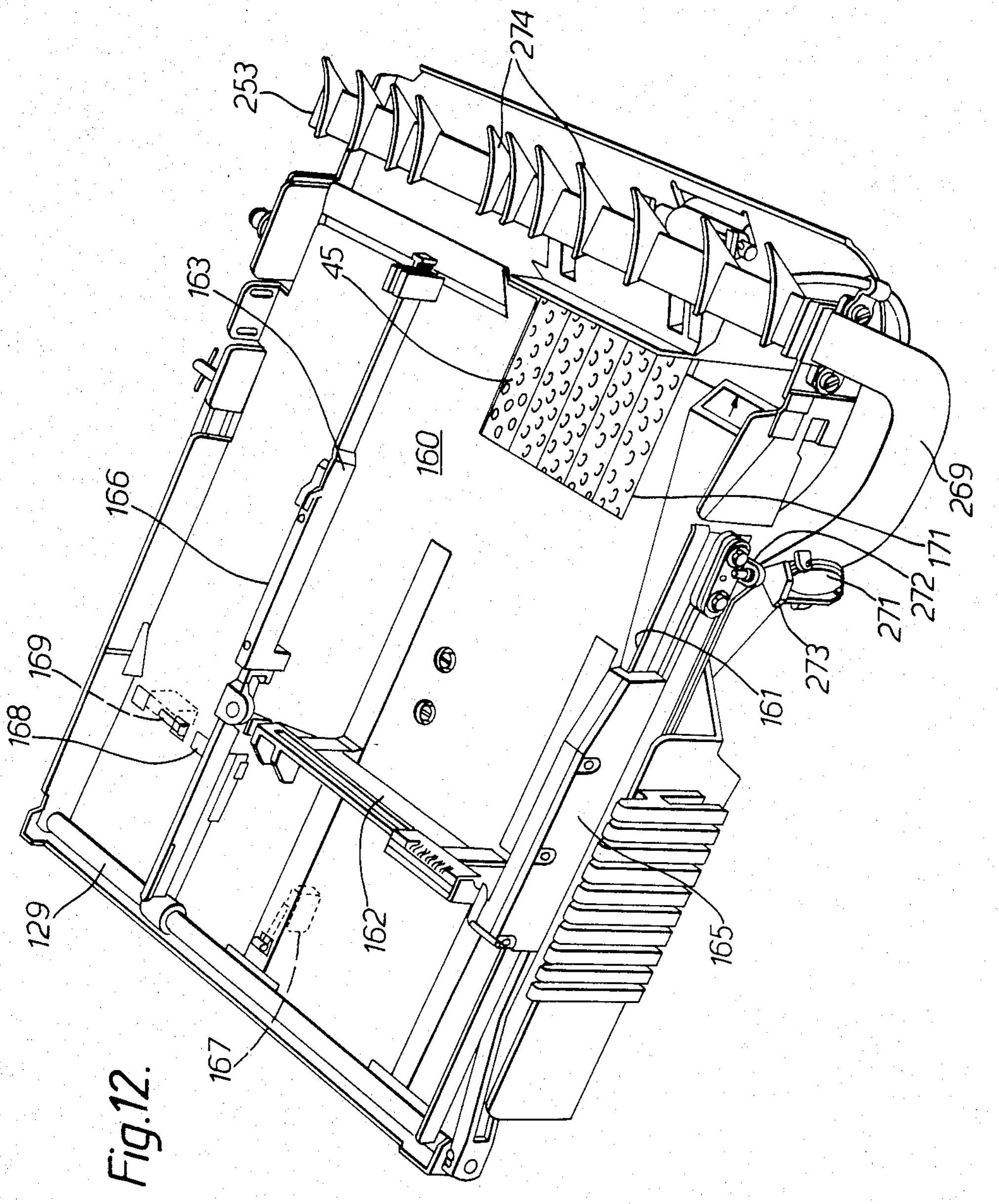
Figure 13:
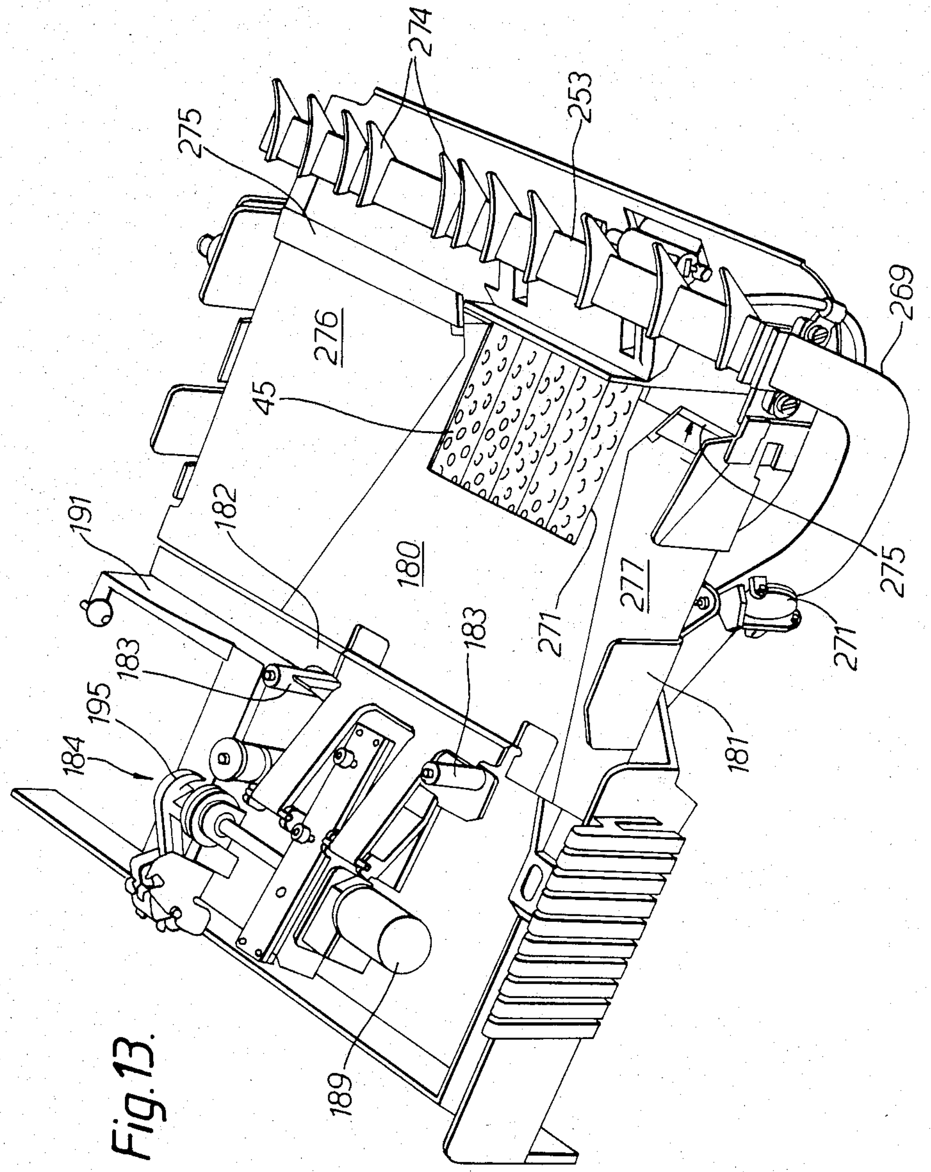
Figure 14:
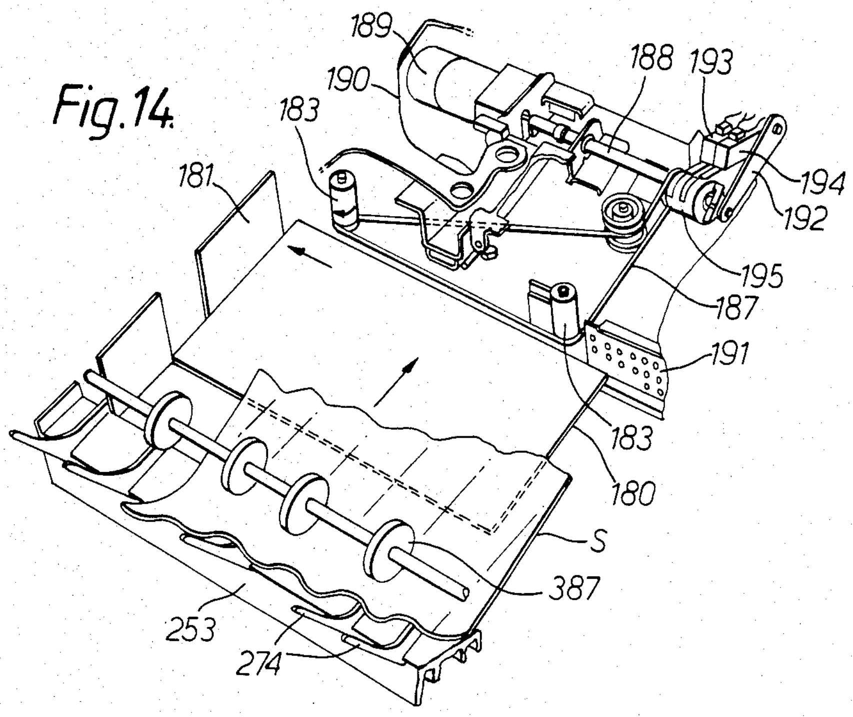
Figure 17:
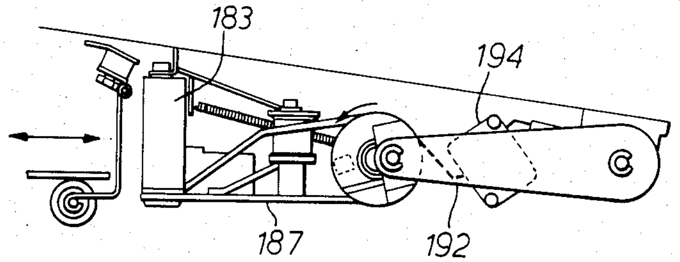
Figure 18:
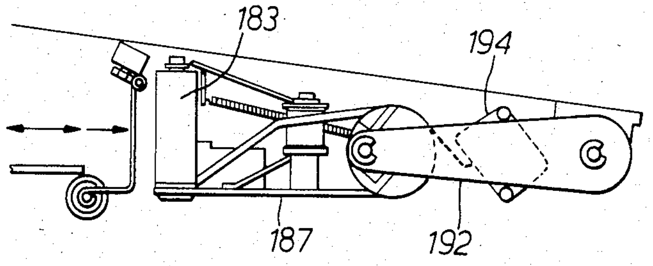
Figure 15:
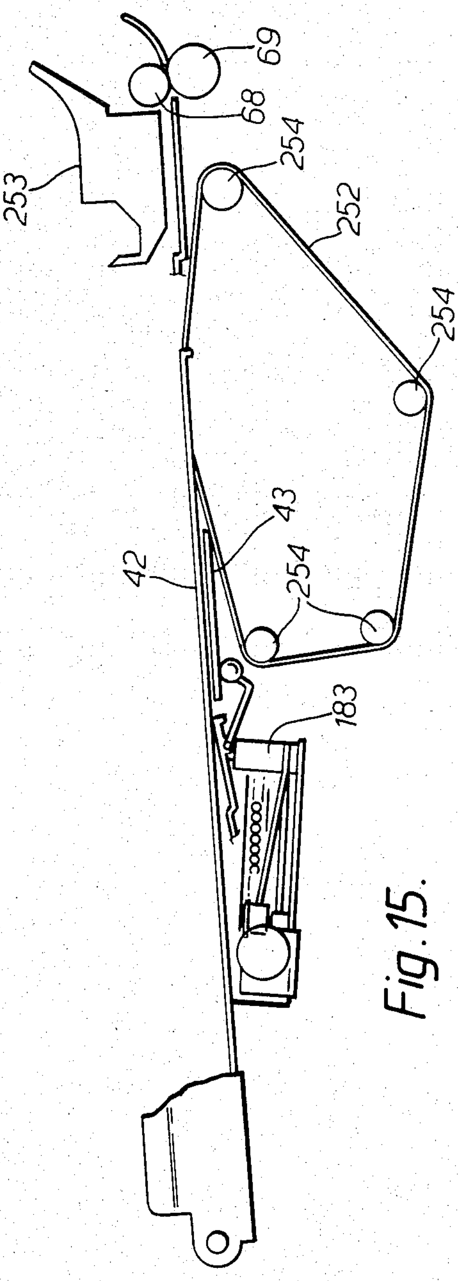
Figure 16:
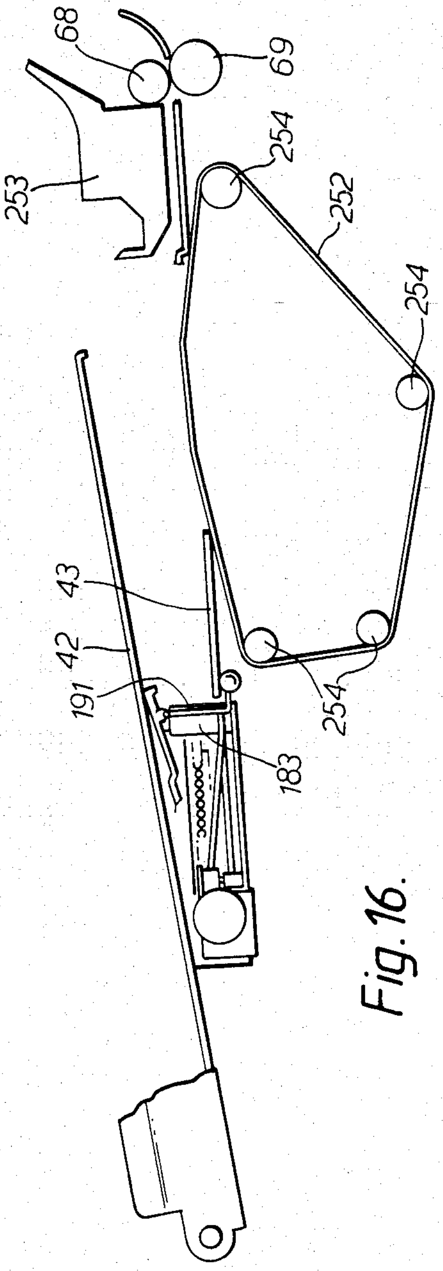
Figure 19:
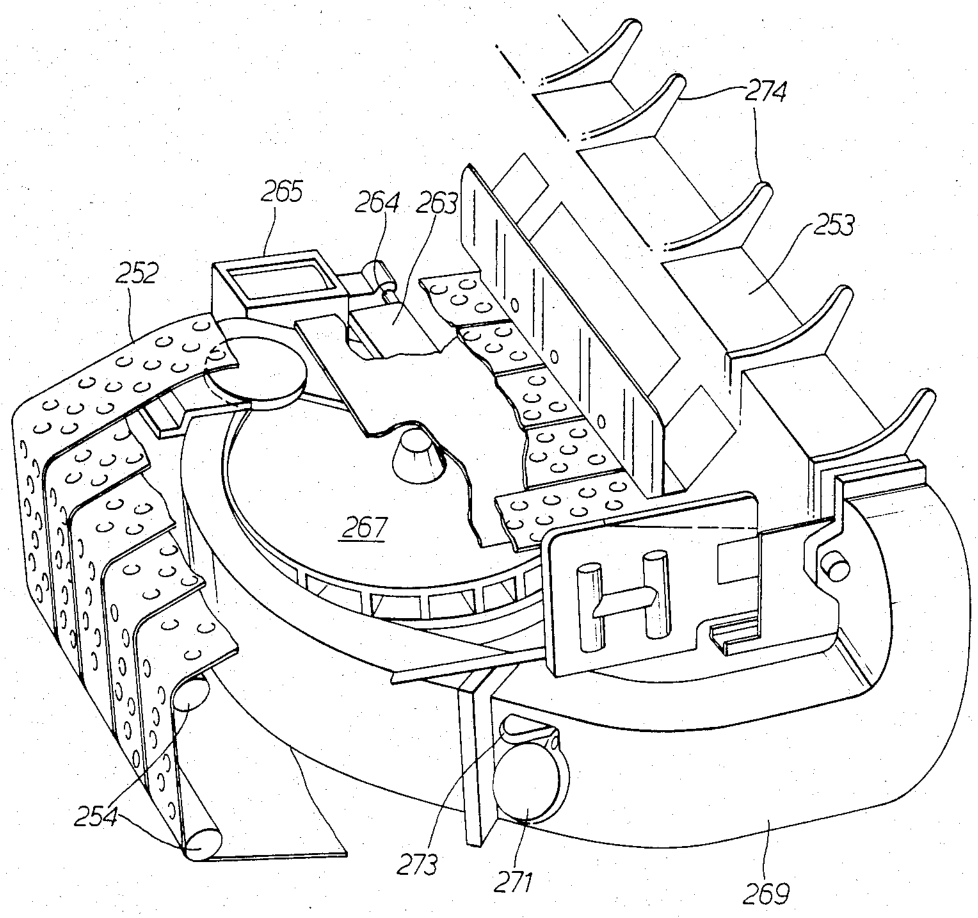
Figure 20:
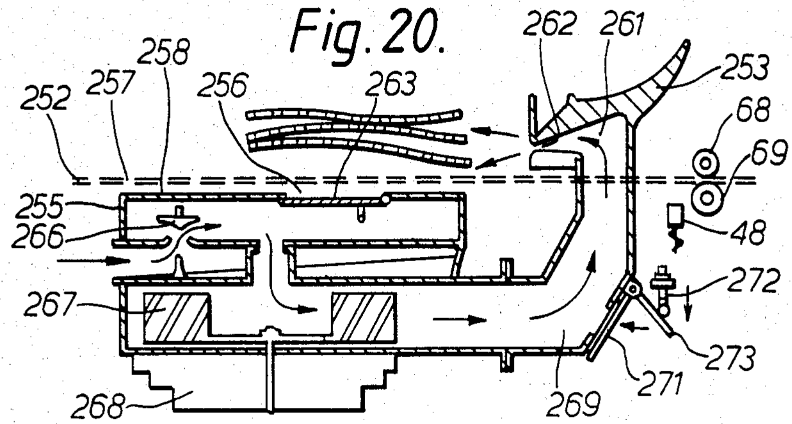
Figure 21:
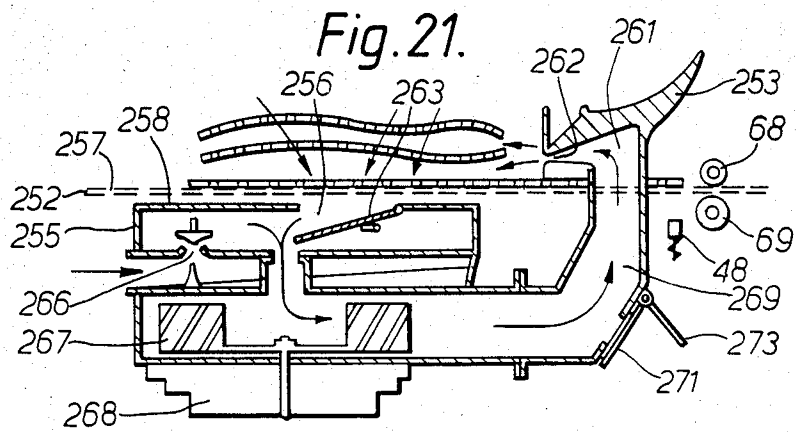
Figure 22:
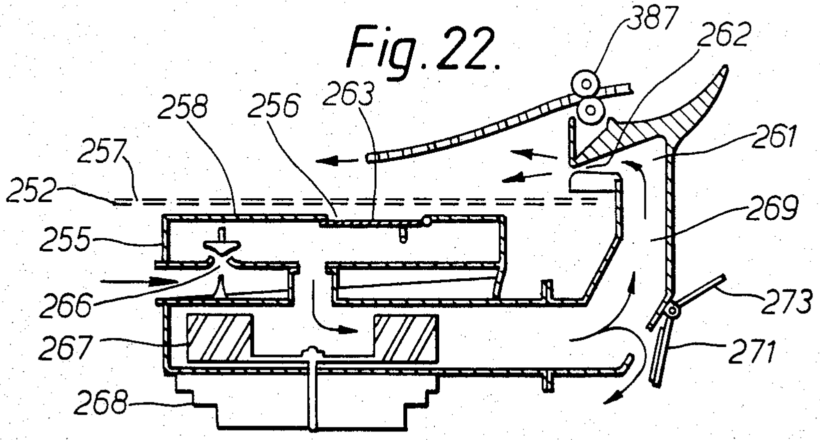
Figure 23:
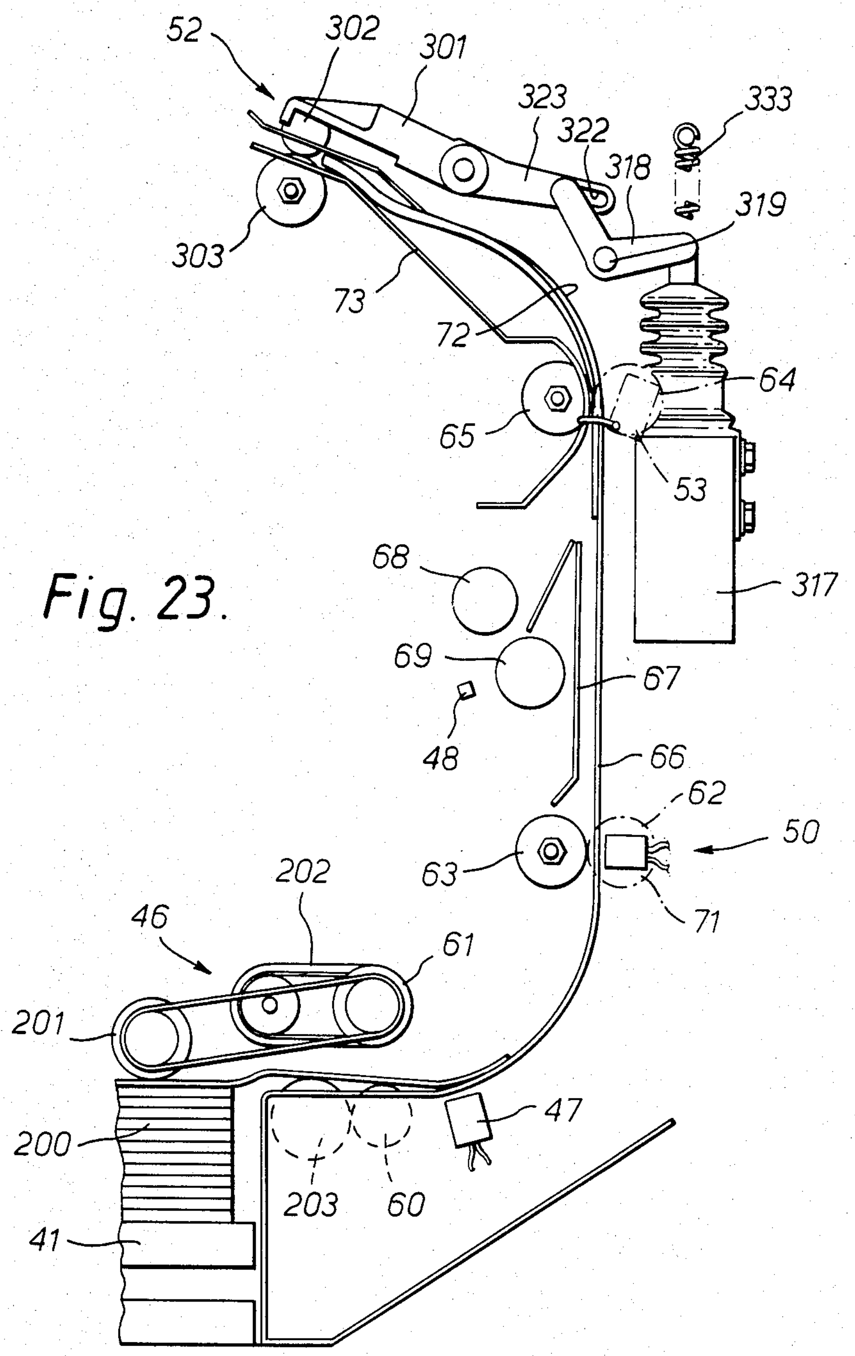
Figure 24:
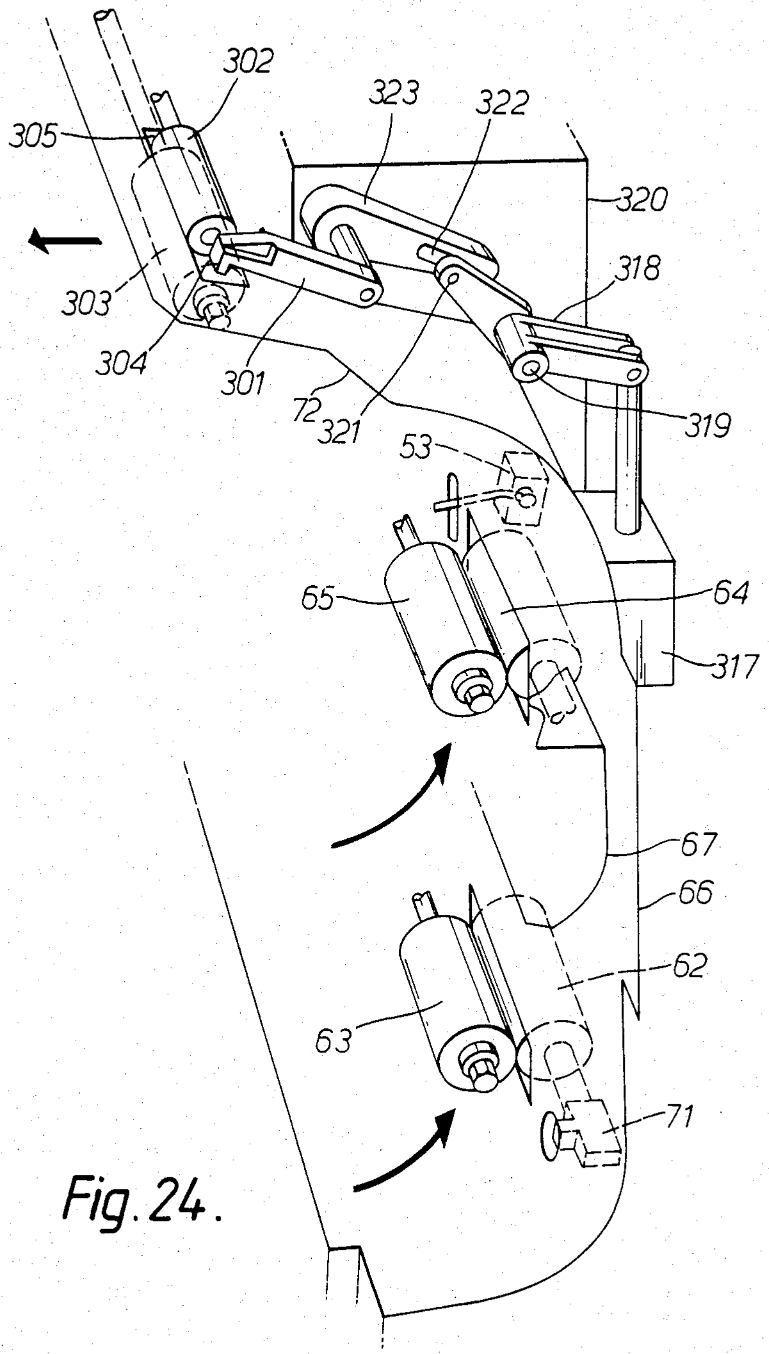
Figure 25:
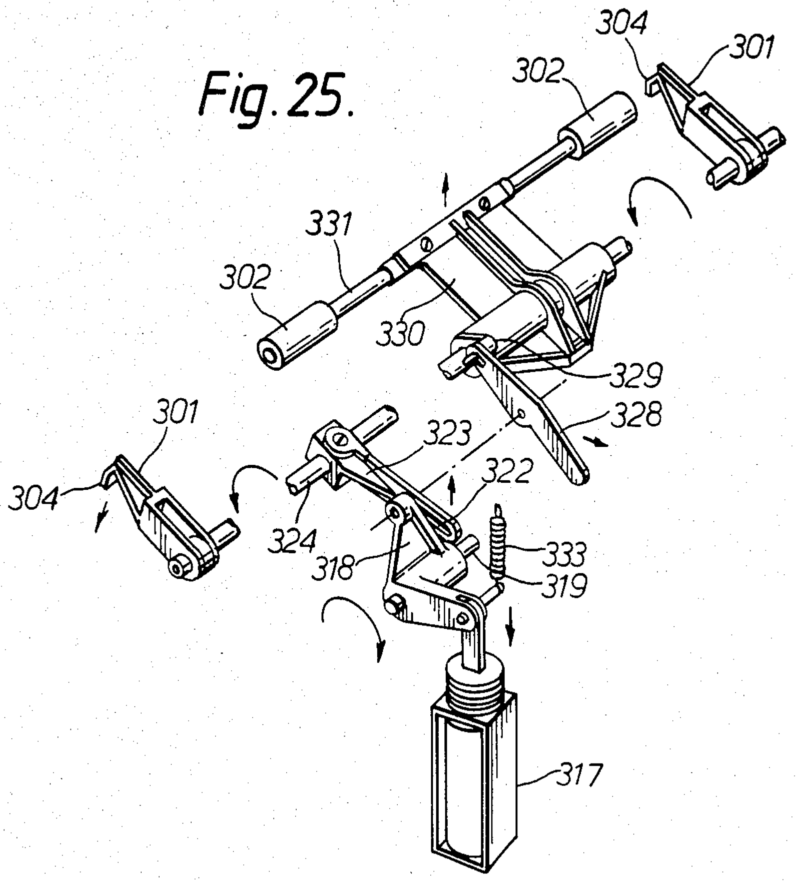
Figure 26:
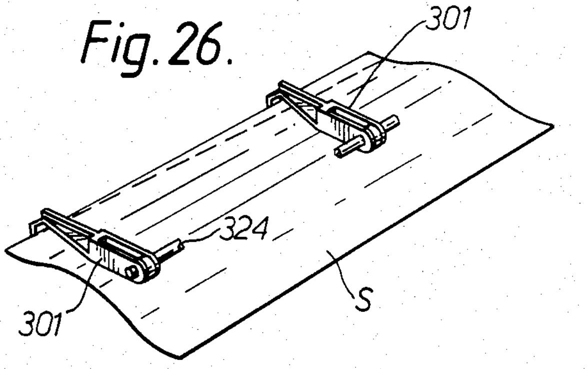
Figure 27:
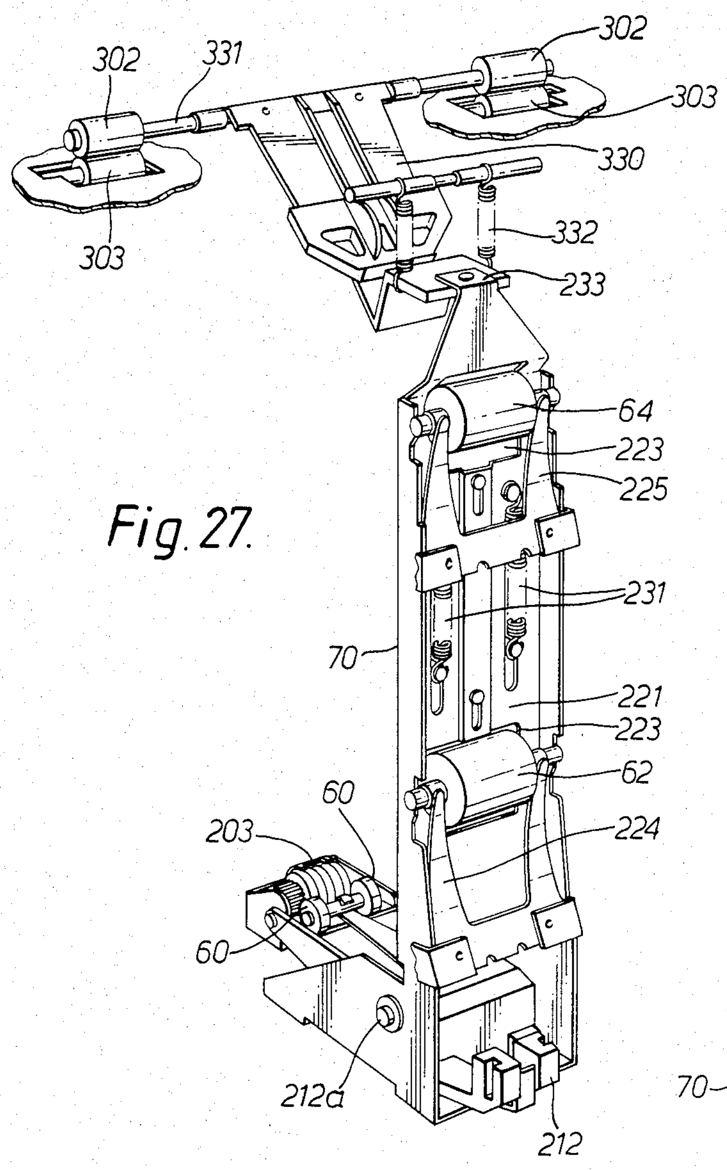
Figure 28:
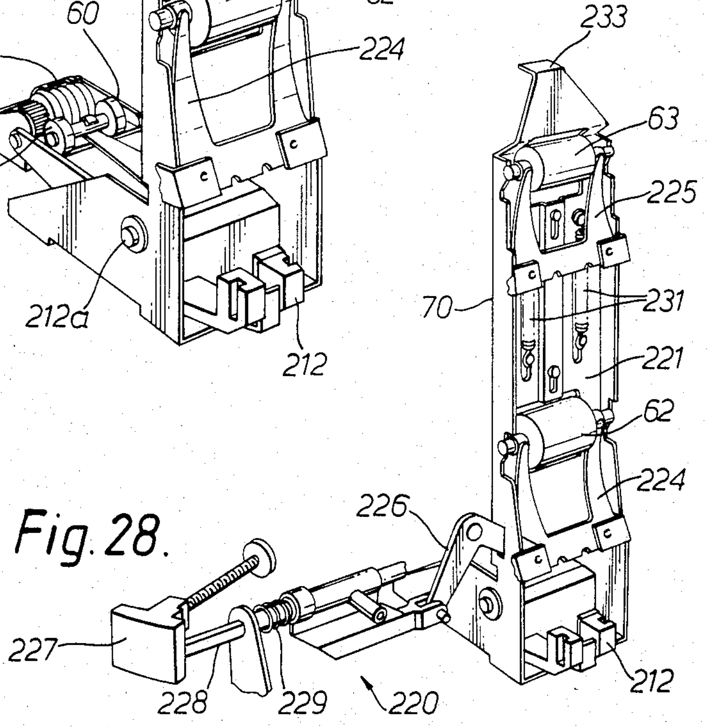
Figure 29:
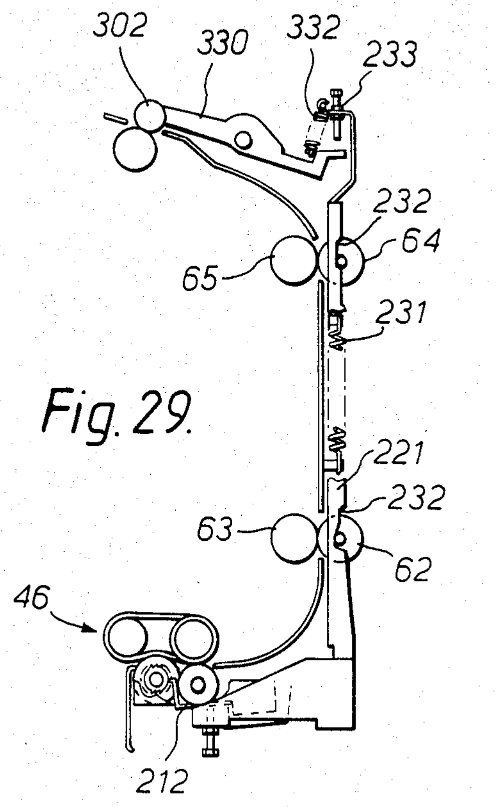

In order that the invention may be more readily understood, reference will now be made to the accompanying drawings, in which:

FIG. 1 is a schematic side elevational view of a duplex copying machine incorporating the present invention showing the operational elements thereof, FIG. 2 is a schematic side elevational view of a copying machine like that shown in FIG. 1 incorporating a semi-automatic document handler and a sorter, FIG. 3 is a schematic side elevational view of a copying machine like that shown in FIG. 1 incorporating an automatic recirculation document handler and a copy finisher, FIG. 4 is a perspective view of the paper tray assembly of the copying machine with parts omitted for clarity, FIG. 5 is a front view of an elevation assembly for the paper trays in a lowered position, FIG. 6 is a view like that of FIG. 5 showing the elevation assembly in raised position FIG. 7 is a scrap view of the paper tray assembly showing the mounting of the upper tray unit, FIG. 8 is a top perspective view, partly broken away, of the main paper tray, FIG. 9 is a schematic perspective view of a retard roll sheet feeder for feeding sheets from the main paper tray, FIG. 10 is a scrap view of the sheet feeder illustrating the operation thereof, FIG. 11 is a perspective view of the retard roll assembly of the sheet feeder of FIG. 9, FIG. 12 is a top perspective view of the upper paper tray unit with the auxiliary tray lowered, FIG. 13 is a view like that of FIG. 12 showing the upper paper tray unit with the auxiliary tray omitted, FIG. 14 is a partly schematic top perspective from another angle of the upper tray unit with the auxiliary tray omitted, FIG. 15 is a schematic side elevation of the upper tray unit with the auxiliary tray in its lowered position, FIG. 16 is a schematic side elevation of the upper tray unit with the auxiliary tray in its raised position, FIGS. 17 and 18 are side elevations of an adjustable backstop arrangement for the buffer tray showing it in two different positions, FIG. 19 is a partly exploded top perspective, scrap view of the sheet feeder of the upper tray unit, FIGS. 20 and 21 are schematic side elevations of the sheet feeder of FIG. 19 showing different stages in sheet feeding from the auxiliary tray, FIG. 22 is a view like those of FIGS. 20 and 21 showing sheet feeding into the buffer tray, FIG. 23 is a schematic side elevation of the pre-transfer sheet path leading from the sheet feeders to the photoreceptor and showing a mechanism for registering sheets at the output end of the transport, FIG. 24 is a partial perspective view of the sheet path shown in FIG. 23, FIG. 25 is a partly broken away view of the elements of the registration mechanism illustrating their operation, FIG. 26 shows a detail of the registration mechanism, FIG. 27 is a perspective view from the back of the pre-transfer sheet transport to the photoreceptor showing a mechanism for separating the drive nips of the transport to facilitate removal of jammed sheets, FIG. 28 is a view like that of FIG. 27 showing greater detail, FIG. 29 is a side elevation of the pre-transfer sheet path to the photoreceptor showing the transport nips closed.

Figure 30:
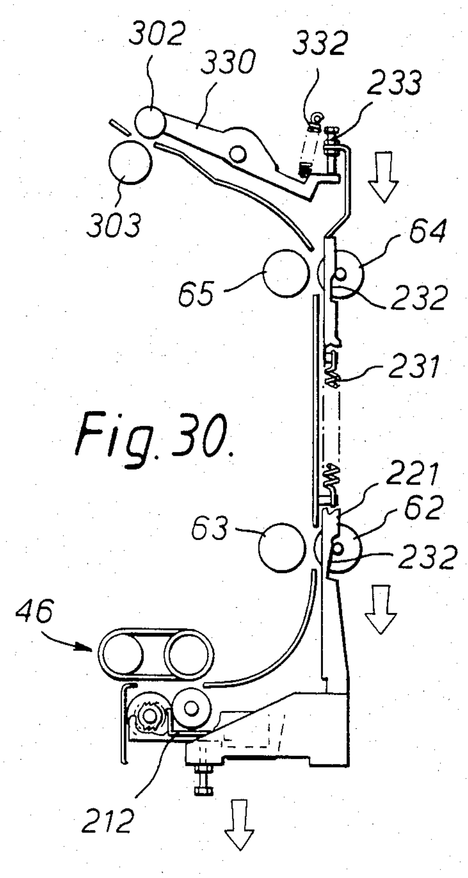
Figure 31:
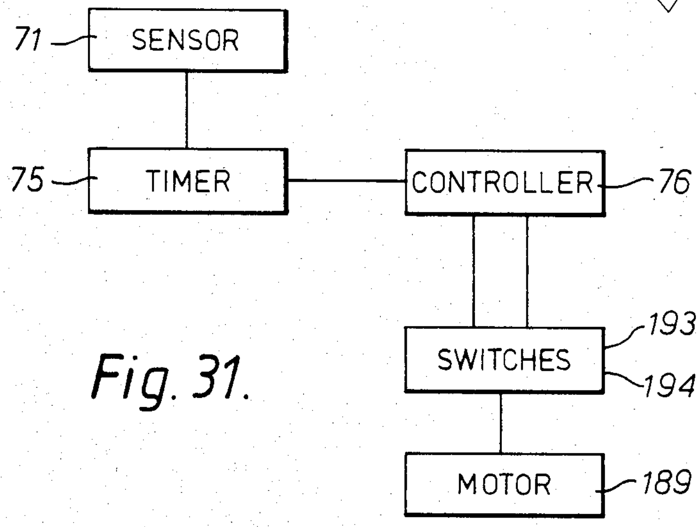
Figure 32:
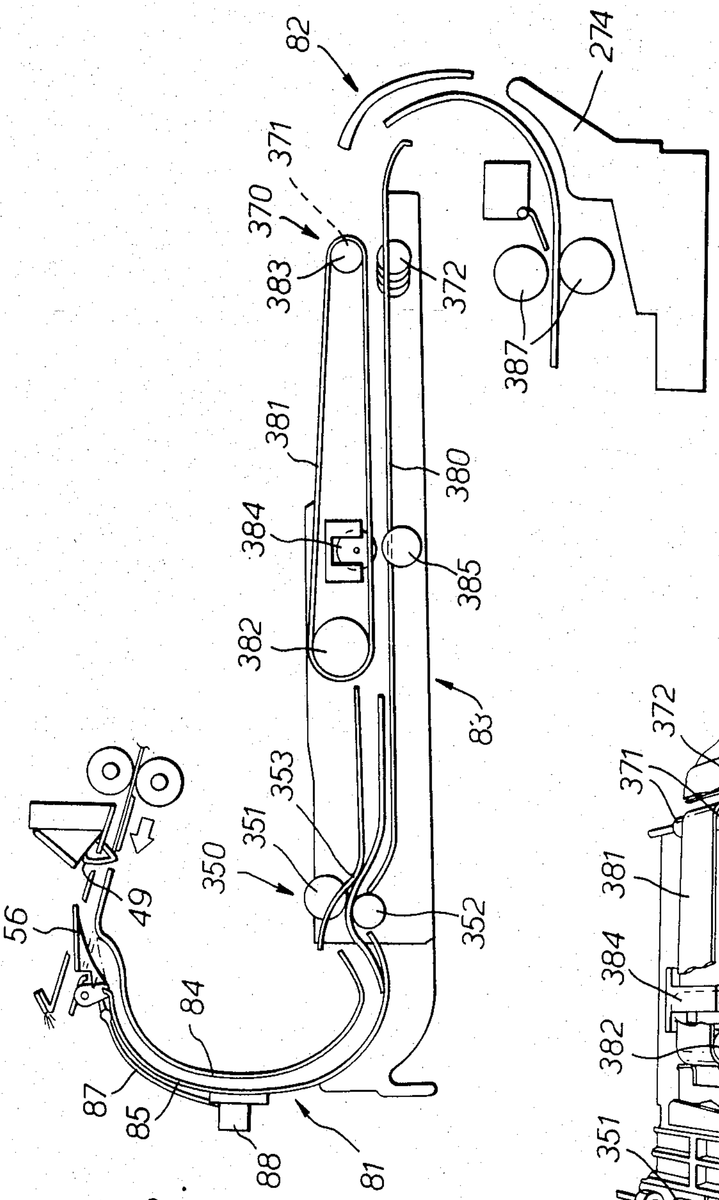
Figure 35:
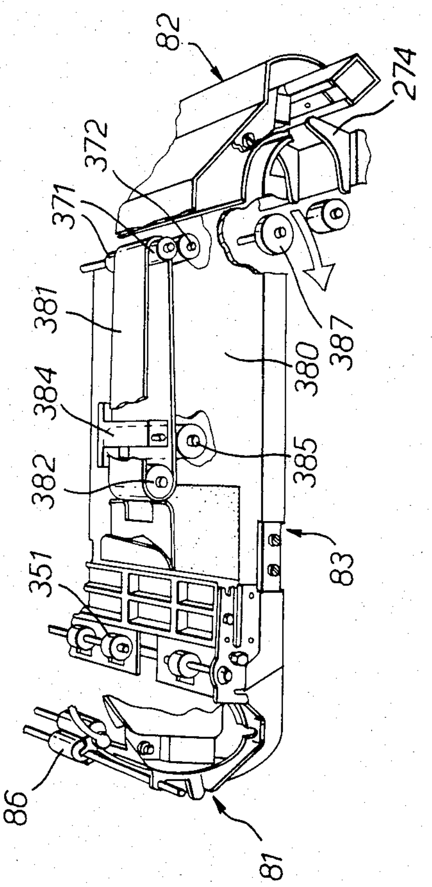
Figure 33:
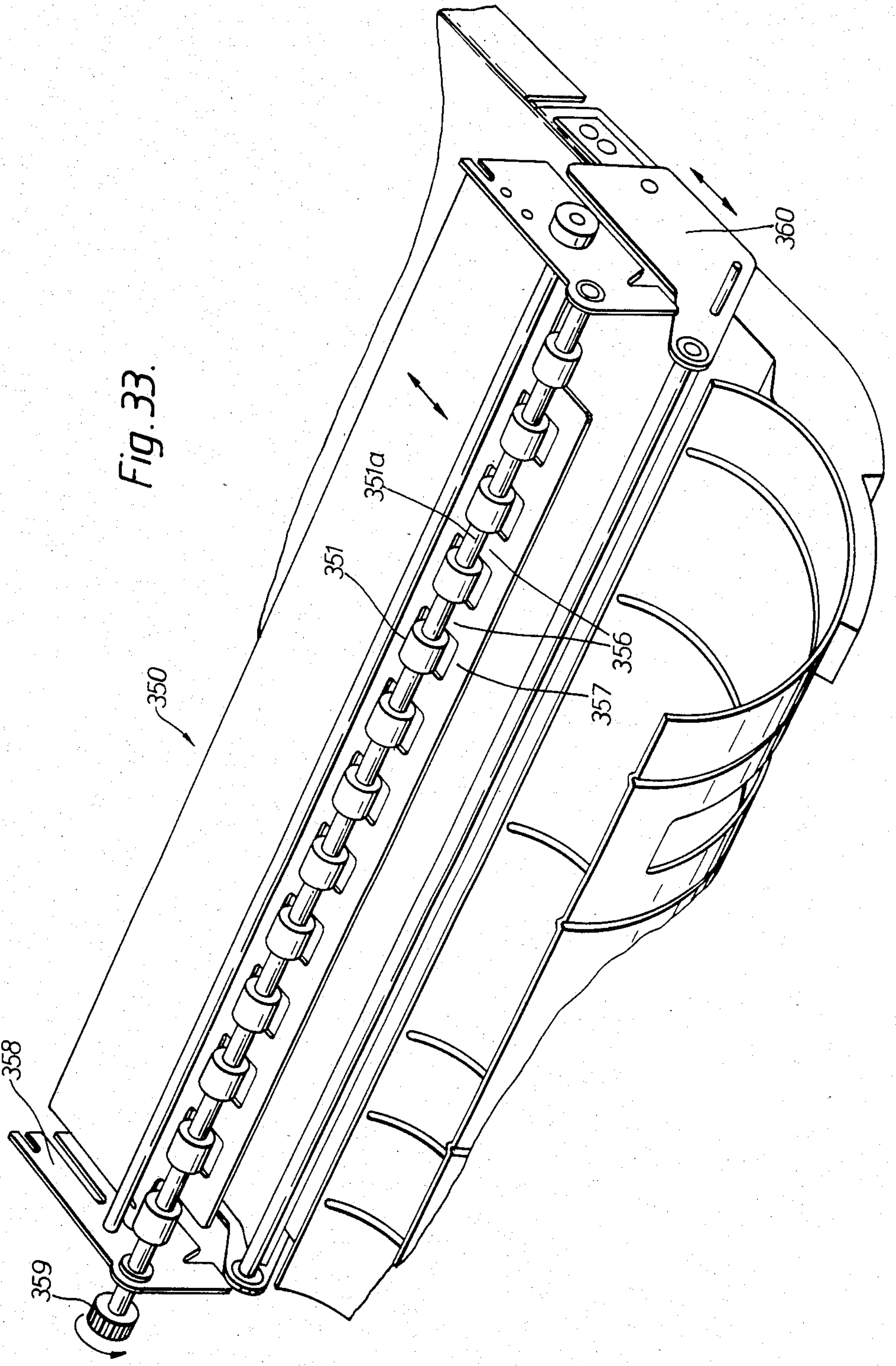
Figure 34:
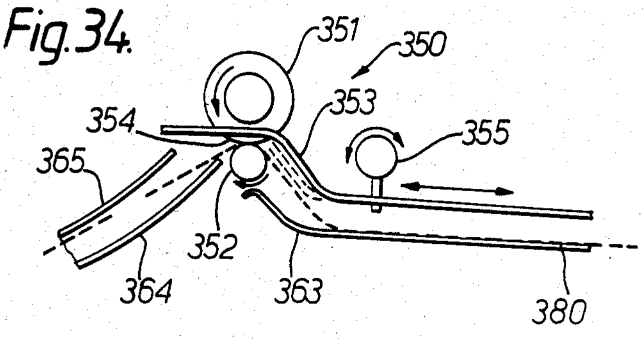
Figure 36:
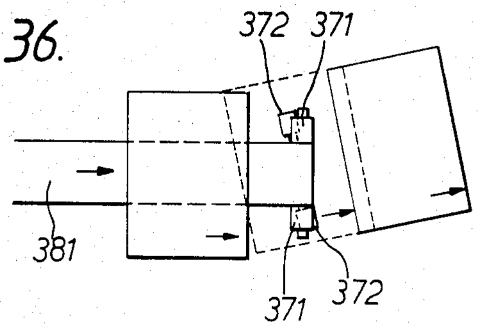
Figure 37:
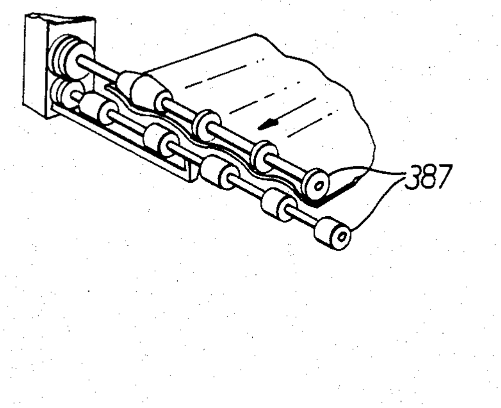
Figure 38:
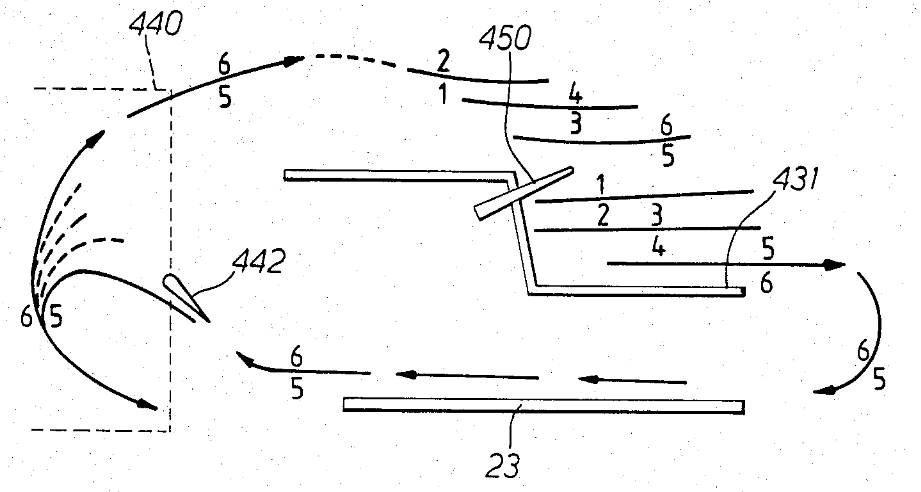
Figure 40:
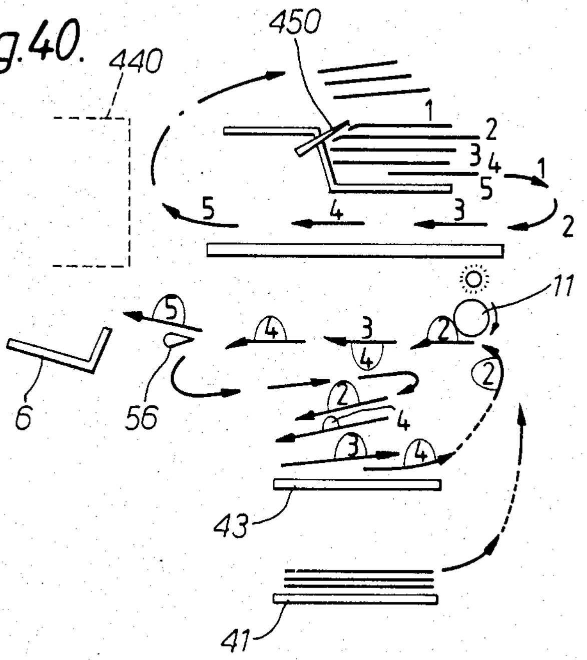
Figure 41:
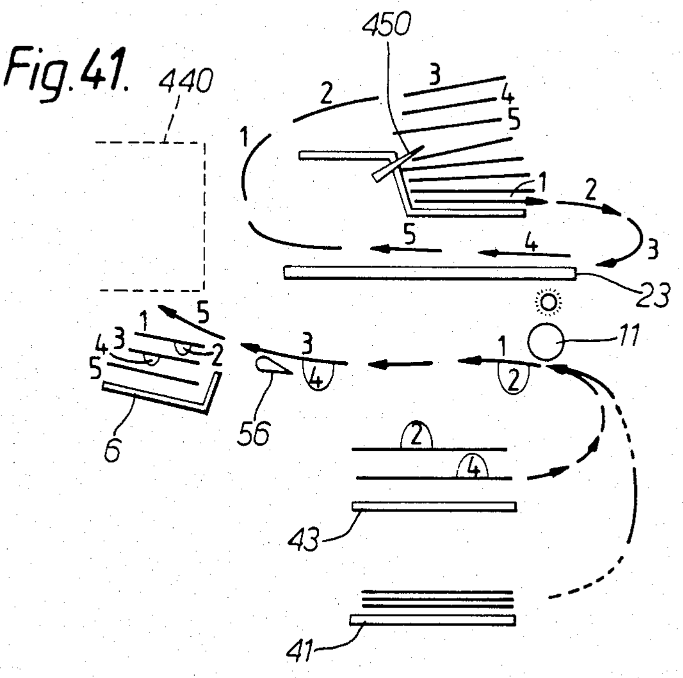
Figure 42:
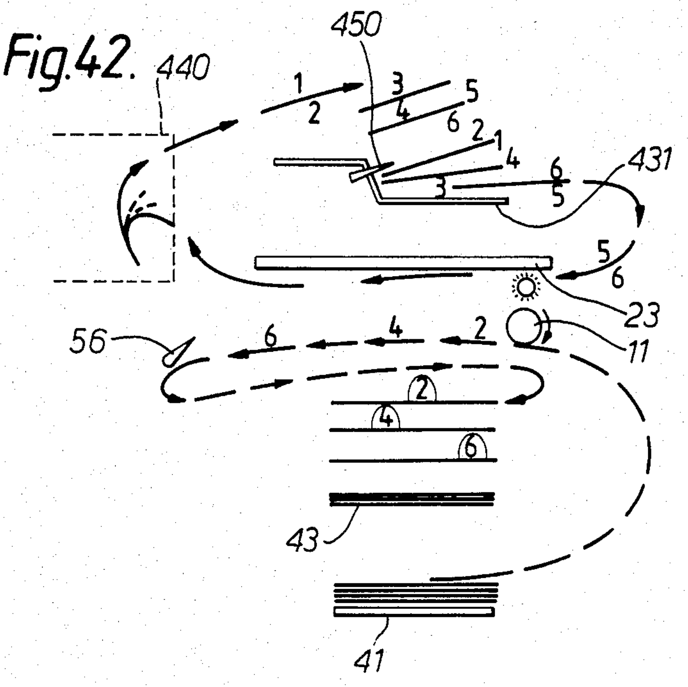
Figure 43:
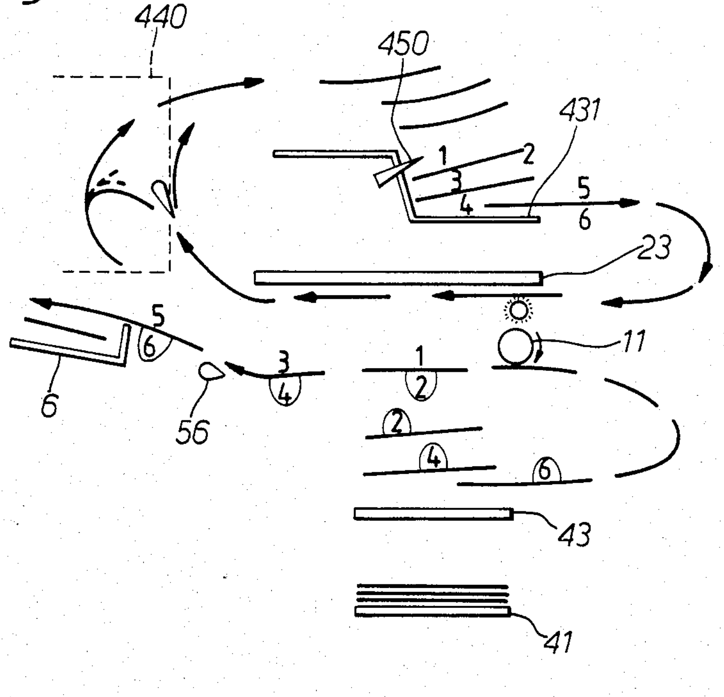

FIG. 30 is a view like that of FIG. 29 showing the transport nips separated, FIG. 31 is a block diagram illustrating the manner of adjusting the backstop of the duplex buffer tray, FIG. 32 is a schematic side elevation of the post-transfer and return paper paths, FIG. 33 is a perspective view of a sheet decurler mechanism arranged in the sheet return path, FIG. 34 is a cross-section through the paper decurler of FIG. 33, FIG. 35 is a perspective view partly broken away of the sheet return path, FIG. 36 is a scrap plan view of the sheet return path showing offsetting of sheets being conveyed to the buffer tray, FIG. 37 is a scrap perspective view of feed rollers for inserting sheets into the buffer tray, FIG. 38 is a schematic representation of a step in the operation of the recirculation document handler of the embodiment of FIG. 3, FIGS. 39 to 41 schematically illustrate the operation of the apparatus shown in FIG. 3 when making duplex copies from simplex originals, and FIGS. 42 and 43 schematically illustrate the operation of the FIG. 3 apparatus when making duplex copies from duplex originals.

Referring first to FIG. 1 there is shown a xerographic copying machine 1 incorporating the present invention suitable for duplex copying, that is for producing copies printed on both sides, as well as for producing simplex (single-sided) copies. As will be described in detail hereinafter, a copier as illustrated may be used to produce collated duplex copies either by post-collation, preferably using a semi-automatic document handler 2, with the copies collected in a sorter 3 as shown in FIG. 2, or by pre-collation using an automatic recirculation document handler 4 and a copy finisher 5 as shown in FIG. 3. An offsetting catch tray or simplex catch tray 6 as shown in FIG. 1 may be used in place of the output devices of FIGS. 2 and 3 although in the embodiment of FIG. 2 collation would not then be achieved.

The copying machine 1 includes a photoreceptor drum 11 mounted for rotation (in the clockwise direction as seen in FIG. 1) to carry the photoconductive imaging surface of the drum sequentially through a series of xerographic processing stations: a charging station 12, an imaging station 13, a development station 14, a transfer station 15, and a cleaning station 16.

The charging station 12 comprises a corotron which deposits a uniform electrostatic charge on the photoreceptor. A document to be reproduced is positioned on a platen 23 and scanned by means of a moving optical scanning system to produce a flowing light image on the drum at 13. The optical image selectively discharges the photoconductor in image configuration, whereby an electrostatic latent image of the object is laid down on the drum surface. At the development station 14, the electrostatic latent image is developed into visible form by bringing into contact with it toner particles which deposit on the charged areas of the photoreceptor. Cut sheets of paper are moved into the transfer station 15 in synchronous relation with the image on the drum surface and the developed image is transferred to a copy sheet at the transfer station 15, where a transfer corotron 17 provides an electric field to assist in the transfer of the toner particles thereto. The copy sheet is then stripped from the drum 11, the detachment being assisted by the electric field provided by an a.c. de-tack corotron 18. The copy sheet carrying the developed image is then carried by a transport belt system 19 to a fusing station 20.

After transfer of the developed image from the drum, some toner particles usually remain on the drum, and these are removed at the cleaning station 16. After cleaning, any electrostatic charges remaining on the drum are removed by an a.c. erase corotron 21. The photoreceptor is then ready to be charged again by the charging corotron 12, as the first step in the next copy cycle.

The optical image at imaging station 12 is formed by optical system 22. A document (not shown) to be copied is placed on platen 23, and is illuminated by a lamp 24 that is mounted on a scanning carriage which also carries a mirror 26. Mirror 26 is the full-rate scanning mirror of a full and half-rate scanning system. The full-rate mirror 26 reflects an image of a strip of the document to be copied onto the half-rate scanning mirrors 27. The image is focussed by a lens 28 onto the drum 11, being deflected by a fixed mirror 29. In operation, the full-rate mirror 26 and lamp 24 are moved across the machine at a constant speed, while at the same time the half-rate mirrors 27 are moved in the same direction at half that speed. At the end of a scan, the mirrors are in the position shown in a broken outline at the left hand side of FIG. 1. These movements of the mirrors maintain a constant optical path length, so as to maintain the image on the drum in sharp focus throughout the scan. Alternatively the optical system 22 may be fixed in position and the document scanned by being advanced across it by the document handler 2 or 4 as described below.

At the development station 4, a magnetic brush developer system 30 develops the electrostatic latent image. Toner is dispensed from a hopper 31 by means of a rotating foam roll dispenser 32, into developer housing 33. Housing 33 contains a two-component developer mixture comprising a magnetically attractable carrier and the toner, which is brought into developing engagement with drum 11 by a two-roller magnetic brush developing arrangement 34.

The developed image is transferred, at transfer station 15, from the drum to a sheet of copy paper (not shown) which is delivered into contact with the drum by means of a paper supply system 40. Paper copy sheets are stored in two paper trays; a lower, main tray 41 and an upper, auxiliary tray 42. Also provided is a dedicated duplex tray or buffer tray 43 which, during duplex copying receives simplex copies, i.e. those which have been printed on one side only, and which are subsequently re-fed from the buffer tray back to the photoreceptor to receive a second image on the other side to form the duplex copies. As will be explained in more detail hereinafter, the upper, auxiliary tray 42 and the buffer tray 43 have a common bottom sheet feeder 45 and the auxiliary tray is pivotable between an operative position in which it lies within the buffer tray and a raised inoperative position in which sheets may be received in the buffer tray. Paper sheets are fed from the main tray 41 by a top sheet separator/feeder 46. Sheets from each of the trays are directed along pre-transfer paper transport path 50 for registration at a registration point 52. Once registered, the sheet is fed into contact with the drum in synchronous relation to the image so as to receive the image at transfer station 15.

As shown in FIGS. 1 and 23, the sheet transport from the main tray 41 to the photoreceptor comprises the sheet separator feeder 55 which includes take-away nip rolls 60, 61 which drive a sheet into contact with a pre-transfer guide member 66 which turns the sheet upwardly through 90° into the nip of lower transport rolls 62, 63 by which the sheets are conveyed vertically between outer guide 66 and an inner guide 67 into the nip of upper transport rolls 64, 65 by which sheets are conveyed to the registration point 52. Sheets from the buffer tray 43 or auxiliary tray 42 are conveyed into the nip of upper transport rolls 64, 65 by upper tray take-away rolls 68, 69. Operation of the transport is initiated by the machine logic and controlled by an input micro-switch 53 arranged at the upper transport rolls 64, 65.

The copy sheet carrying a transferred image on one or both sides as the case may be is transported by means of vacuum transport belt 19 to fuser 20, which is a heated roll fuser. The image is transferred to the copy sheet by the heat and pressure in the nip between the two rolls 36, 37 of the fuser. The copy is then fed from the fuser either to catch tray 6, which as mentioned is suitably an offsetting catch tray, via output nip rolls 54 or is returned to the buffer tray 43 along a sheet return or duplex path 55 depending upon the position of a diverter 56 arranged at the output of the fuser 20. This return path 55 is folded back upon itself at the exit from the fuser 20 to form curved guide portion 81 and again at the entrance to the buffer tray 43 along curved guide portion 82, the two portions 81 and 82 being connected by a horizontal portion 83 extending beneath the fuser 20, the transport belt 19 and the photoreceptor 11. Simplex sheets stored in the buffer tray 43 are fed out from the tray in the opposite direction to that in which they enter the tray. Because of the double folded arrangement of the sheet return path 55, sheets fed out of the buffer tray 43 to the pre-transfer paper transport 50 will be the same way up as when they passed the photoreceptor 11 so that they are correctly positioned to receive an image on the other side thereof. This is because the pre-transfer transport 50 inverts the sheets as they are conveyed to the photoreceptor.

After transfer of each developed image from the drum to the copy sheet the drum surface is cleaned at cleaning station 16 which includes a doctor blade mounted within a housing. The doctor blade scrapes residual toner particles off the drum, and the scraped-off particles then fall into the bottom of the housing where they are removed by an auger (not shown).

The elements of the copier are carried by a frame 57 and are all enclosed by a cover 58 having a front access door; the catch tray 6 of FIG. 1 protrudes through the side cover. The copier is suitably mounted on castors. The platen 23 is covered by a hinged top cover 59 which can be raised for access to the platen. The cover 59 may, as in FIG. 2, incorporate a semi-automatic document handler 2 by which copies inserted manually at one side are automatically fed onto the platen 23 for copying and then fed off the platen after copying, or as in FIG. 3, an automatic recirculation document handler 4 by which documents arranged in a stack are fed onto the platen one at a time for copying and then returned to the stack after copying. The copier may also have a sorter 3 as shown in FIG. 2 or a finisher 5 as shown in FIG. 3 arranged to receive copies from the output nip rolls 54.

As mentioned above, sheets may be fed from either the main tray 41 or the auxiliary tray 42 and during duplex copying are delivered into the buffer tray 43 and re-fed therefrom. The auxiliary tray 42 is of a larger size than the main tray, enabling a wider choice of paper sizes and types to be fed from it. The buffer tray 43 accepts a limited range of paper sizes as described below. The trays are physically located in the lower part of the machine below the photoreceptor drum 11.

The paper tray assembly referred to by the general designation 90 will now be described in detail with reference to FIGS. 4 to 22. The assembly 90 includes a lower paper tray unit 91 including the main tray 41 and its feeder 46 and an upper paper tray unit 92 including the auxiliary tray 42 and the buffer tray 43, together with their common feeder 45. The paper tray assembly 90 includes a sub-frame 93 which is mounted from the main frame 57 of the copier and the paper tray units 91 and 92 are carried in cantilever fashion from the sub-frame 93.

The lower tray unit 91 is mounted for vertical movement on a pair of vertical rails 101 of the sub-frame 93 to permit the main tray 41 to be raised into engagement with the associated top feeder 46 and maintained in contact therewith as the paper supply in the tray is consumed, while at the same time permitting the tray to be lowered for loading paper into the tray. For easy access to the main tray 41 for loading and jam clearance the tray is mounted on a pair of horizontal rails 102 so that it may be withdrawn through the open front access door of the copier.

The upper tray unit 92 includes a vertically fixed component 103 incorporating the duplex buffer storage tray 43 and the common bottom feeder 45. In FIG. 4 an adjustable back stop arrangement for the buffer tray has been omitted but this can be seen in FIGS. 13 to 18. The auxiliary tray 42 is hinged at 129 about its left-hand (as seen in FIG. 1) or rear end so that its right-hand or feed end can be pivoted between a raised, inactive position as shown in FIGS. 2, 4, 7 and 16 in which copies may be delivered and re-fed from the buffer tray and a lowered, operative position as shown in FIGS. 1, 12 and 15 in which it interacts with the bottom feeder 45 so that sheets may be fed out of the auxiliary tray along the same path as sheets from the buffer tray 43. As best seen in FIG. 7, the component 103 is mounted on a pair of horizontal rails 104 and the auxiliary tray 42 is mounted on a third rail 105 at its hinged end. As explained in more detail below, when the auxiliary tray is lowered the entire upper paper tray unit 92 can be withdrawn through the open front door of the copier for access for loading of the auxiliary tray and for jam clearance and when the auxiliary tray is in its raised position it is locked against withdrawal and the buffer tray component 103 can be withdrawn on its own for jam clearance during duplex copying. Locking of the auxiliary tray 42 against withdrawal in its raised position is effected by a pin (not shown) which engages behind a slot 106 in the sub-frame 93 except at the lower end of the slot which is enlarged.

Raising and lowering of the main tray 41 and the auxiliary tray 42 is effected by an elevator mechanism 110 as shown in FIGS. 5 and 6 which is designed to ensure that the auxiliary tray is always raised if the main tray 41 is raised and that the main tray 41 is always lowered if the auxiliary tray is lowered. This is achieved by a common cable drive system and a weighting of the auxiliary and main trays which ensures that the main tray 41 is always effectively heavier than the auxiliary tray 42 even when the main tray is empty and the auxiliary tray is full. The cable drive system comprises a cable 112 having its opposite ends connected to a capstan 113 mounted on the back of the lower tray unit 91. The cable 112 passes under a pair of pulleys 114 fixed on the lower paper unit 91 and over pairs of guide pulleys 115, 116 fixed to the paper tray assembly sub-frame 93. A loop of cable between the pulleys 76 passes under a pulley 117 mounted on a slide block 118 which is vertically movable between lower and upper limit positions on slides 119. The forward or feed end of the auxiliary tray 42 (shown in dotted outline in FIGS. 5 and 6) is attached to the slide block 118. A pair of tension springs 120 attached between the rear end member 91*a* of the lower paper tray unit 91 and the sub-frame 93 ensure that the lower or main paper tray 41 always has a greater effective weight than the upper, auxiliary tray 42. A tension spring 121 attached between the slide block 118 and the sub-frame 93 maintains the cable 112 in tension.

The capstan 113 is driven by a motor 122 which is also mounted on the rear end 91*a* of the lower paper unit 91.

The elevator mechanism 110 is shown in FIG. 5 with both trays 41 and 42 in their lowered positions. In order to raise the auxiliary tray 42 the motor 122 is energised to drive the capstan 113 clockwise as seen in FIG. 5 in order to wind cable thereon. Because the auxiliary tray 42 is effectively lighter than the main tray 41, the former will begin to elevate first and will continue doing so with the main tray stationary until the slide block 118 reaches its upper limit position which actuates an auxiliary tray upper position sensor switch 123. Continued rotation of the capstan 113 will cause the main tray to rise until the top of the paper stack 200 in the main tray engages the underside of a nudger wheel 201 forming part of the sheet feeder 46. The nudger wheel 201 is lifted by engagement by the top sheet in the stack in the paper tray 41 and actuates a main tray upper position sensor switch 124 which deactivates the motor 122. As paper in the main tray is consumed during sheet delivery the motor 122 will be periodically switched back on so as to elevate the tray and maintain engagement with the paper feeder 46. The paper tray suitably elevates approximately 1 mm for every ten sheets of 80 gsm paper being fed.

In FIG. 6 the auxiliary tray 42 is shown in its fully raised position and the main tray 41 is shown partly raised.

For lowering the trays, the capstan 113 is rotated anti-clockwise to unwind the cable 112 whereupon the lower, main tray 41 is lowered to its down position which is sensed by a main tray lower position sensor switch 125. Lowering of the auxiliary tray is effected by further rotation anti-clockwise of the capstan 113 until the slide block 118 reaches its lower limit position when an auxiliary tray lower position sensor 126 is actuated to cause the motor 122 to be switched off.

The positioning of the paper trays is as follows. Except when duplex copying has been selected, whenever the front door of the copier is opened, a door open sensor (not shown) will cause the machine logic to activate the capstan motor 122 to position both the auxiliary tray 42 and the main tray 41 in their lowered positions. When the front door is closed and paper feed from the main tray 41 has been selected or duplex copying has been selected both the main tray and the auxiliary tray will be driven to their raised positions. If on the other hand paper feed from the auxiliary tray has been selected then both the auxiliary tray and the main tray will be positioned in their lowered positions. If the front door of the copier is opened while the copier is in duplex mode then the main tray 41 will be lowered but the auxiliary tray 42 will remain in its raised position. In fact, in this circumstance the main tray is driven downwards a short distance by the motor 122 driving the capstan 113 anti-clockwise until the auxiliary tray upper sensor switch 123 opens which signals the machine logic to reverse the motor 122 and drive the auxiliary tray back to its upper limit position, whereupon closure of the switch 123 causes the motor 122 to be switched off. This ensures that the auxiliary tray is always fully raised when the front access door is opened in duplex mode. This in turn ensures that the duplex buffer tray 43 can be withdrawn without interference from the raised auxiliary tray 42 which remains locked in position as explained above.

It will be noted that whenever the auxiliary tray 42 is lowered for sheet feeding from the auxiliary tray the main tray 41 is lowered and whenever the main tray 41 is raised against the upper sheet feeder 46 the auxiliary tray 42 is also raised.

As shown in FIG. 7, the auxiliary tray releasably interacts with the slide block 118 by means of a shaft 127 which projects from the back of the auxiliary tray into a hole in the elevator slide block. A pin (not shown) projecting radially of this shaft engages behind the sub-frame 93 except when the auxiliary tray is in its lowered position thus preventing withdrawal of the auxiliary tray in all positions other than its lower limit position. The main tray 41 and the buffer tray component 103 are both releasably held firmly in their fully inserted positions by suitable snap-in catch members (not shown).

The main paper tray 41 has, as best shown in FIG. 8, an upstanding front wall 141 and a left-hand side wall 142. Sheets are registered against front wall 141 by a movable corner piece 143 which is mounted for left-to-right sliding movement on a slide 144 which is itself mounted for front-to-back sliding movement on a slide 145. A handle 146 is provided on the front of the tray for withdrawal of the tray by an operator along rails 102.

As seen in FIG. 8, a trigger 147 on the slide 145 actuates paper size sensing switches which are set to commonly used paper sizes. The three switches illustrated will sense paper lengths of 14 inches, A4 and 11 inches. Instead of three switches only two switches may be provided, one indicating 14 inch paper and the other either A4 or 11 inch paper. As described in detail below the width of the copy paper loaded is sensed during the passage of the paper sheets to the registration point 52 by means of a width sensor 71 (FIG. 23) which signals the passing of the sheet lead and trail edges during paper feed.

As shown in FIGS. 1 and 23, the sheet transport from the main tray 36 to the photoreceptor comprises the sheet separator feeder 46 which includes feed rolls 60, 61 which drive a sheet into contact with an outer guide member 66 which turns the sheet upwardly through 90° into the nip of take-away nip rolls 62, 63 by which the sheets are conveyed vertically between guide 66 and an inner guide 67 into the nip of common paper feed rolls 64, 65 by which sheets are conveyed to the registration point 52. Sheets from the buffer tray 43 or auxiliary tray 42 are conveyed into the nip of common rolls 64, 65 by upper tray take-away rolls 68, 69. Operation of the transport is initiated by the machine logic and controlled by an input micro-switch 53 arranged at the nip rolls 64, 65.

Sheet separator/feeder 46 is a friction retard top sheet feeder of the belt-on-roll type and will now be described with particular reference to FIGS. 9, 10 and 11. Sheets S are fed from a stack 200 which is brought, by the positioning of the paper tray 41 as already described, into the feeding position. The top sheet in the stack is engaged by the nudger wheel 201, which on rotation feeds the top sheet towards the nip formed between a feed belt 202 and a retard roll 203.

Feeding from the paper trays by the nudger wheel 201 is obtained by creating a stack normal force (e.g. of 1.5 newtons) between the nudger wheel and the paper stack. This force is achieved by the weight of the nudger wheel and its associated components acting under gravity. The nudger wheel 201 is mounted on an axle 204 which is mounted for rotation in a weighted suspension arm 205. Suspension arm 205 is in turn mounted for angular motion about a fixed shaft 206 that is spaced from the axle 204.

The feed belt 202 is an endless belt arranged around a drive pulley 207 and an idler pulley 208. The belt 202 is deflected from below on its lower run by the retard roll 203 which is pressed against the belt.

Drive pulley 207 is secured to the shaft 206 which is driven through a feed clutch in the machine drive system. The axle 204 of the nudger wheel 201 is driven from shaft 206 by means of a toothed belt 210.

As paper is being fed from the stack 200, the paper tray 41 will elevate approximately 1 mm for every 10 sheets of 80 gsm paper being fed. This is sensed by the microswitch 124 (FIG. 5) which is operated by the suspension arm 205 of the nudger wheel, which determines the relative position of the paper stack to the feeder.

At the beginning of a print cycle, the machine logic will interrogate the system to determine if any paper is in the paper path. If there is no paper the logic will initiate a signal to the feed clutch, thereby starting the feeder. The nudger wheel 201 will drive the top sheet of paper in stack 200 into the nip between feed belt 202 and retard roll 203. The feed belt is made of soft rubber material with a high friction surface. As the feed belt 202 rotates it drags a sheet of paper from the stack. Frictional forces and static electricity between the sheets of paper in the stack may cause several sheets to move into the nip together.

If several sheets of paper approach the nip together, the friction between the retard roll 203 and the bottom sheet of those being fed is greater than that between two sheets. The friction between the feed belt 102 and the top sheet S1 is also greater than the friction between two sheets. The group of sheets being fed towards the nip will therefore tend to become staggered around the curved surface of the retard roll 203 up into the nip, until the lower sheet S2 of the top two sheets is retained by the retard roll 203, while the topmost sheet is fed by the feed belt 202. Of course, in order for this to happen, the friction between the feed belt 202 and a paper sheet must be greater than the friction between a paper sheet and the retard roll 203. Therefore the feed belt 202 drives the top sheet S1 away from the stack, and the next sheet S2 is retained in the nip to be fed next (as in FIG. 10).

A lead-in baffle or shield 211 extends in front of the retard roll 203, and serves both to guide paper into the nip, and to prevent undue wear of the retard roll by sheets fed from the top of the stack by the nudger wheel.

The feed clutch remains energised (i.e. the feeder mechanism continues to operate) until paper is sensed by a sensor 71 at the lower transport rolls 62, 63. Paper whose leading edge has reached this sensor 71 is under the control of the lower transport rolls 62, 63 that drive the sheet into the nip of the upper transport rollers 64, 65.

The surface speed of the feed belt 202, at the interface with the retard roll 203, is approximately 20% faster than the machine process speed, but due to friction losses between the belt, paper and retard roll, the paper speed is approximately equal to the process speed. The friction losses are not, of course, constant, since they tend to vary with paper weight, size and surface finish.

As shown in FIG. 11 the retard roll 203 and shield 211 are carried on a mounting block 212 which is operationally positioned so that the retard roll 203 is held against the underside of the belt 202. The block 212 is pivotally mounted for rotation about an axis 212a for retracting the retard roll 203 from the belt 202 as explained below.

In order to obtain a constant speed for sheets leaving the feeder, they are advanced from the feeder by the take-away nip rolls 60, 61. As seen in FIGS. 9 and 11, these comprise a pair of drive rolls 61 mounted on the shaft 206 on opposite sides of the drive pulley 207 and a pair of coacting pressure rolls 60 carried by one end of a leaf spring 215 which urges the rolls 60 against rolls 61. The spring 215 has its other end secured to the block 212 which also supports the retard roll 203. The diameter of the driven feed rolls 61 is greater than the diameter of the feed belt 202. Thus the feed rolls drive the paper faster than the feed belt. The feed belt drive pulley 107 contains a one-way clutch which prevents the feed belt from causing drag.

As mentioned above, the upper tray unit 92 includes the auxiliary tray 42, the duplex buffer tray 43 and the sheet feeder 45. As shown in FIG. 12 the auxiliary tray has a floor 160, a fixed front wall 161 and universally adjustable side and rear walls 162, 163. One end of the rear wall 163 is slidably mounted on the axle 164 about which the auxiliary tray is pivoted and its other end slides on the floor of the auxiliary tray. The side wall 162 which is telescopic extends between sliders 165, 166 mounted on the front wall 161 and the rear wall 163 respectively. A switch 167 actuated by the side guide 162 and sensor switches 168 and 169 actuated by the rear guide 163 are provided to detect commonly used paper sizes (for example the switch 167 may be used to detect A3 size or 17 inch long paper which is fed from the tray short edge first and the switches 168 and 169 may be used to detect 14 inch long and A4 or eleven inch long paper, both of which are fed long edge first).

A cut-out 171 in the floor 160 of the auxiliary tray 42 exposes the feed belts 252 of the sheet feeder 45 to sheets stacked in the auxiliary tray. The structure and operation of the sheet feeder 45 are described below.

The duplex buffer tray 43 is best seen in FIGS. 13 and 14 in which the auxiliary tray has been removed for clarity. The buffer tray 43 has a floor 180 through which the feed belts 252 of the sheet feeder 45 project as described below. The buffer tray receives simplex or single-sided copy sheets, that is to say sheets that have already received printed information on one side thereof, from the sheet return path 55. Sheets delivered from the main tray are fed long edge first and, as will be noted from the description above of the paper trays, are registered by their front side edges, i.e. their side edges adjacent the front of the copier, relative to the photoreceptor drum 11. As will be explained in detail below, sheets travelling along the return path 55 are offset slightly towards the rear of the paper path to ensure that they enter the buffer tray without interfering with the front wall 181 of the buffer tray against which they are registered in the tray so as to be accurately aligned for re-feeding to the photoreceptor 11. The tray also includes a backstop 182 incorporating scuffer rolls 183 for driving the sheets against the front wall 181 of the buffer tray.

In order to accommodate sheets of different widths in the buffer tray, the backstop 182 is adjustable, for example to accommodate paper width between 8 inches and 8½ inches, between fore and aft limit positions by means of a backstop adjustment mechanism 184. The backstop 182 and its adjustment mechanism 184 are mounted on the upper paper tray unit 92 for movement as best seen in FIGS. 15 and 16 between a raised operative position as shown in FIG. 16 and a depressed inoperative position as shown in FIG. 15 where it has been pushed down below the level of the buffer tray floor 180 by the auxiliary tray 42 as it is lowered into its operative position.

The scuffer rolls 183 project upwardly from just below a ledge 186 which in the operative position of the backstop forms a continuation of the floor 180. The scuffer rolls rotate clockwise as seen from above about vertical axes and are driven through an O-ring drive 187 off the drive shaft 188 of a motor 189 mounted on the backstop frame 190. The scuffer rolls are made of a suitable high friction material such as polyurethane. A back wall section 191 arranged just behind the scuffer rolls assists in straightening skewed sheets.

Adjustment of the backstop is effected automatically in response to the sensing of the width of sheets being fed long edge first from the main tray during duplex copying in the manner explained below and movement of the backstop is effected by a crank 192 (FIGS. 17 and 18) mounted on the drive shaft 188 under the control of two microswitches 193, 194. The motor 189 is reversable and the crank 192 is connected to the shaft 188 through a one-way clutch so that in the normal driving direction of the shaft in which the scuffer rolls are rotated clockwise the crank 192 is disengaged. However, when the motor is reversed for adjustment of the backstop position the crank 192 is engaged. The degree of movement of the crank 192 is controlled by the microswitches 193, 194 which have their actuaters riding on cams 195 mounted on the drive shaft 188. For adjusting the position of the backstop the motor 189 is actuated by a signal from the machine logic (microprocessor) in dependance upon the width sensed for the sheets being delivered from the main tray and timed via the microswitches 193, 194 which together provide for three stop positions of the adjustable backstop in which respectively switch 193 is actuated, switch 194 is actuated and both switches are actuated. It will be noted that during adjustment of the backstop, the scuffer rolls 183 rotate anti-clockwise, but this is no disadvantage since there should be no sheets present in the buffer tray during adjustment.

The width of the sheets, i.e. their dimension in the direction in which they are travelling (long edge first), is sensed by the sensor 71 at the lower transport rolls 62, 63. As schematically represented in FIG. 31, the sensor 71 is connected to a timer 75 which times the passage of the lead and trail edges of the sheet past the sensor 71 and sends a signal indicative of sheet width to a controller (microprocessor) 76. The controller operates the microswitches 193, 194 to operate the motor 189 in dependance upon sheet width to position the backstop 182.

In FIGS. 17 and 18 the fully advanced and fully retracted positions of the backstop are shown respectively.

As shown in FIG. 14 sheets from the sheet return path 55 enter the buffer tray through driven corrugating rollers 387 (only the top set of which is seen in FIG. 14) by which they are driven towards the backstop 182 where the scuffer rolls 183 register the sheets against the front wall 181 of the buffer tray. As will be seen the buffer tray 43 slopes downwardly towards the backstop 182 and this assists in maintaining contact between the sheets and the scuffer rolls 183 and at the same time assists in ensuring registration of the sheets in the fore and aft direction, i.e. against the backstop.

Sheet separation and acquisition is accomplished by a vacuum belt bottom sheet corrugation feeder (VCF) 45 from both the buffer tray 43 and the auxiliary tray 42 using flotation pressure differences between the bottom sheet and the sheets above, sheet corrugation and vacuum. The floors of the trays 42, 43 interfit and are shaped to form a contour pocket 251 at the lead edge of each tray which is dished down in the manner described for example in our copending United Kingdom patent application no. 8226848 filed 21 Sept. 1982 so that documents placed in the tray bridge this gap and form a flotation pocket. Transport belts 252 surface through the trays within the contour pocket 251. Sheet stack flotation is accomplished by a frontal assault of air from an air knife 253. The air jet impinges on the tray 42 or 43 just in front of the lead edge of the document stack; this permits volumetric flow expansion of air within the pocket of the tray and also riffles the front edge of the sheet stack to allow a differential pocket of air between the bottom sheet and the next sheet. This assists in the acquisition, separation and feeding of the bottom document.

The vacuum belt corrugation feed mechanism 45 acquires the bottom sheet in the stack and forwards it to the take-away roll pair 68, 69 after the air knife 253 has had time to separate the bottom sheet from the rest of the stack. The take-away rolls 68, 69 advance the sheets into the common roll nip 64, 65 from which the sheets are conveyed to the registration point 52.

Referring more particularly to FIGS. 19 to 22 wherein the sheet separator feeder 45 is more clearly illustrated, there is disclosed a plurality of feed belts 252 supported for movement on feed belt rolls 254 (see also FIG. 1). Spaced within the run of the belts 252 there is a vacuum plenum 255 having vacuum openings or ports 256 therein adapted for cooperation with perforations 257 in the belts 252 to provide a vacuum for pulling the bottom sheet in the sheet stack onto the belts 252. There are five rubber vacuum belts 252, the centre belt **252*a* preferably being raised slightly above the four outer belts, so as to produce a corrugation when the sheet is pulled down by the vacuum. The frequency and size of the holes 257 in the belts 252 regulates the volume of air that can be drawn through them. The transport belts 252 move across the top plate 258 of the vacuum plenum 255 and the frequency and size of the ports 256** regulates the volume of air that can be drawn into the vacuum chamber beneath.

Since the belts 252 extend through a dished portion or pocket 251 of the sheet tray so that they are below the surrounding support surfaces of the tray the bottom sheet is drawn down into the pocket as air is drawn through the perforated belts 252 into the vacuum plenum 255 so initiating separation of the bottom sheet from the remaining sheets in the stack. Further sheet separation is effected by the air flow from the air knife 253 which comprises a pressurised air plenum 261 having a plurality of air jet openings 262 provided to inject air into the pocket formed between the bottom sheet pulled down against the feed belts 252 and the sheets thereabove to provide an air cushion or bearing between the stack and the bottom sheet to minimise the force necessary for removing the bottom sheet from the stack. The air flow from the air knife 253 also has the effect of riffling the stack and reducing the effective weight of the paper stack.

To further increase the efficiency of the system, the buffer tray 43, and also the auxiliary tray 42, are as mentioned above provided with a rearward tilt as shown for example in FIGS. 15 and 16. When flotation air is provided under the stack or between the first and second sheets, gravity will allow the sheets to settle or float back against the back wall of the tray (backstop 182). Thus the sheet being removed is pulled uphill while gravity holds the remainder of the sheets back, helping to prevent multi-feeds.

The sheet feeder 45 is shown in exploded perspective view in FIG. 19 and in schematic sectional view in FIGS. 20 and 21. It will be seen that within the vacuum plenum chamber 255 is housed a vacuum flap valve 263 which regulates the timing of the vacuum through the openings in the top plate 258 and the belts 252 and hence the acquisition timing of documents. The valve 263 is actuated by a shaft 264 which passes through the side wall of the vacuum chamber and is attached to a solenoid 265. A vacuum relief valve 266 is also provided in one of the chamber walls. It is actuated by the chamber pressure and allows air to the air knife 253 when the vacuum flap valve 263 is closed or when a document has been acquired by the vacuum transport and effectively closed off the inlet ports 256 to the vacuum chamber 255.

Beneath the vacuum chamber 255 is a scroll-shaped impeller housing containing an impeller 267. The impeller 267 is driven by a motor 268 arranged immediately beneath the impeller. Air drawn through the vacuum transport belts 252 and the vacuum plenum chamber 255 is exhausted and ducted to the air knife 253 which is located above the lead edge of the buffer/auxiliary tray.

For feeding sheets from either the buffer tray 43 or the auxiliary tray 42, the solenoid 265 is energised to close the vacuum valve 263. The impeller motor 268 is switched on to drive the impeller 267 causing air to be drawn into the plenum chamber 255 through the vacuum relief valve 266 which is automatically raised by the air pressure. The air drawn into the chamber 255 is vented through the air knife 253 via an air knife duct 269 where it is directed at the paper stack to cause the sheet at the bottom of the stack to be separated by the air flow and the effective weight of the paper stack to be reduced. A drive clutch controlling the take-away rolls 68, 69 is energised to rotate them. The vacuum valve solenoid 265 is now deenergised and the vacuum valve 263 opens so that the bottom sheet of the stack is held against the vacuum feed belts 25. Following a short delay to ensure that the bottom sheet is captured on the belts before belt movement commences and to allow time for the air knife 253 to separate the bottom sheet from any sheets that were pulled down with it, the feed belts are started up to drive the bottom sheet towards the take-away rolls 68, 69. Once the lead edge of the sheet has been acquired by the take-away rolls 68, 69 a sensor signals the microprocessor to reenergise the vacuum valve solenoid 265 to close the vacuum valve 263 to prevent early acquisition of the next sheet. The air knife 253 continues to support the weight of the stack with air being drawn in through the vacuum relief valve 266.

A sensor 48 just ahead of the take-away rolls 68, 69 controls the arrival of the sheet at the take-away rolls 68, 69 in the manner described more fully below.

An air knife relief valve 271 is provided in the air knife duct 269. This valve 271 is open when the auxiliary tray 42 is raised and the buffer tray 43 is in use and is closed when the auxiliary tray 42 is lowered for feeding sheets therefrom. The valve 271 is biased to its open position and is automatically closed upon lowering of the auxiliary tray 42 by a projection 272 on the tray engaging a lever 273 attached to the valve (FIG. 12). The purpose of this valve is explained below.

It will be noted that the corrugating rolls 387 are arranged over the air knife 253 and in order to assist sheet entry into the buffer tray the air knife is provided with guide fins 274 on its upper surface. Further, when duplex copying is selected the impeller motor 268 is switched on immediately sheets are fed from the main tray so as to provide an air flow for sheets arriving in the buffer tray as they leave the corrugating rolls so as to assist their delivery against the backstop 182 and at the same time to reduce friction forces which may othewise inhibit proper registration of the sheets. p In a preferred form of the invention the speed of the impeller motor 268 and thus the air knife pressure and acquisition pressure is varied during sheet delivery from the auxiliary tray 42 in dependance upon the height of the stack of sheets. This enables the provision of sufficient air knife pressure to effect the necessary separation of the bottom sheet for thicker stacks without causing violent agitation and a possible blow-away of sheets in thinner stacks. To this end the height of the stack at the beginning of sheet feed from the auxiliary tray 42 is sensed and the motor speed adjusted to one of a number of stepped speeds according to the height of the stack. During consumption of the stack the sheets are counted and at intervals the motor speed is stepped down. A suitable stack height sensor is described in our copending United Kingdom patent application no. 8226808 filed on 21 Sept. 1982 from which it will be noted that in a preferred form a mechanical sensor arm is engaged by the sheet stack in the auxiliary tray 42 when the latter is in its raised position. In this respect it should be noted that in accordance with the machine control procedures the auxiliary tray is always raised to its upper limit position before it is positioned for sheet feeding whenever the front door of the machine has been opened.

In a preferred form of the invention in which the auxiliary tray will accommodate up to 224 A4 sheets the motor is run at 100% of full speed for 224–160 sheets, 89% for 160–128 sheets, 85% for 128–96 sheets, 80% for 96–64 sheets, 77% for 64–32 sheets and 75% for 32–0 sheets. Such a tray will also accommodate 160 A3 sheets and will run at 100% of full speed for 160–96 such sheets, 89% for 96–48 sheets and 75% for 48–0 sheets.

As explained above, during sheet feed from the duplex buffer tray 43 the air knife relief valve 271 is opened. The capacity of the buffer tray 43 is less than that of the auxiliary tray 42 and it may in the above example accommodate a maximum of 50 sheets. However, simplex sheets arriving from the photoreceptor 11 and having passed through the fuser 20 tend to be more flacid than virgin sheets as used in the auxiliary tray and often have some degree of curl. For this reason a greater acquisition pressure is required through the vacuum valve 263 than for virgin sheets while the air knife pressure should not be so great as to cause violent agitation of the sheets or indeed since the sheets may be downwardly curled, so great as to press several sheets down at the same time against the belts 252 which may lead to multi-feeds. It is for this reason that the air knife relief valve 271 is provided in the air knife duct so that the acquisition pressure can be correctly balanced against the air knife pressure. Thus in the embodiment described above the impeller motor suitably operates at a fixed speed of 87% of full motor speed during feeding from the buffer tray the air knife relief valve 271 being open. This ensures a higher sheet acquisition pressure and a lower air knife pressure compared with sheet feeding from the auxiliary tray.

It will be understood that where the auxiliary tray feed is accomplished without varying the acquisition and air knife pressures that the air knife relief valve 271 will still be desirable for use during buffer tray feeding and where for example the capacities of the auxiliary tray and the buffer tray are the same or not largely dissimilar it may in fact be desirable for the motor speed to be increased during buffer tray feeding compared with auxiliary tray feeding.

As explained above, the lead edges of the sheets to be fed, particularly from the buffer tray 43, may sometimes be curled downwardly causing an increased tendency for the sheets to become shingled because of the increased friction due to the downcurl and because the curl tends to inhibit the flow of air from the air knife 253 between the bottom sheet and the next sheet. As the shingling occurs this latter effect is increased since the lead edges of the sheets approach closer to and may even pass under the air knife. This problem is more pronounced at slower sheet feeds such as those required for feeding documents at a controlled speed to the platen for feeding in constant velocity mode across stationary optics. Where documents can be fed at a higher speed, e.g. where they are copied after registering them on the platen, the problem is less, probably due to the higher inertia.

In order to overcome this problem a pair of ramps 275 are formed at the front end of the support surface at each side of the dished area of the tray. The ramps 275 slope upwardly in the direction of sheet feed and as described in our aforesaid copending United Kingdom patent application no. 8226848 filed 21 Sept. 1982 project forwards beyond the normal lead edge stacking position of sheets in the tray. When a sheet with downcurl is stacked in the tray it has limited beam strength across the tray and such sheets would normlly tend to sag down into the dished area or pocket. The ramps not only raise the lead edges of the sheets above the surface or floor of the tray but may improve the transverse beam strength of the sheet, both of which promote improved air injection.

It will be noted that in the embodiment illustrated the dished areas or pocket in the auxiliary and buffer trays 42, 43 are formed by surface portions 276, 277 at each side of the pocket sloping downwardly towards the pocket which narrows rearwardly from the front end of the tray and expands more gently, sloping wing portions being provided near the front of the pocket which is deepest at the lead edge of the tray. This arrangement is more clearly described and illustrated in FIG. 6 of our aforesaid copending United Kingdom patent application no. 8226848.

Sheets from the feeder 45 or 46 are forwarded by the rolls 64, 65 to the registration nip 52. The purpose of registering sheets at the nip 52 is to enable each sheet to be released to the phototreceptor in synchronism with the developed image on the photoreceptor drum. In addition, registration is used to remove any skew from the sheet. The registration system is shown in FIGS. 23, 24 and 25, which show two (or three) registration fingers 301 on either side of registration pinch rolls 302. The pinch rolls 302 are movable into and out of engagement with coating drive rolls 303 and the fingers 301 are movable between an operative position in which their tips 304 project through slots 305 in the outer guide 66 into the sheet path and a retracted position raised out of the sheet path. The pinch rolls 302 and fingers 301 are operated in the following manner. Prior to the arrival of a sheet at the nip 52, the rolls 302, 303 are disengaged and the fingers 301 are moved to their operative positions. A sheet being driven by the upper transport rolls 64, 65 is deflected downwardly by a curved upper portion 72 of the guide 66 against an opposed guide surface 73 (FIG. 23) which directs the lead edge of the sheet into the registration nip and against the tips 304 of the fingers 301. The surfaces 72 and 73 together form a buckle including chamber which enables the sheet to be overdriven against the fingers 301 so as to remove any skew from the sheet without the sheet creasing. Thus the sheet is caused to assume a smooth buckle as shown in FIG. 26. In order to feed the sheet to the photoreceptor 11 the pinch rolls 302 are engaged with the drive rolls 303 following which the registration fingers 301 are retracted. The drive rolls 303 are then energised to feed the sheet in synchronous relation to the developed image on the photoreceptor.

The registration fingers 301 are actuated through a series of linkages by a registration solenoid 317. As the solenoid 317 is energised, cranked arm 318 rotates clockwise (as viewed in FIGS. 23–25) about a fixed axis pivot pin 319 that is mounted on a support 320. At its upper end, the arm 318 carries an actuating pin 321 which moves along a slot 322 in a link 323, causing link 323 to move anticlockwise about the axis of rod 324. Link 323 is fixed to rod 324, so rod 324 also makes an anticlockwise angular movement. This in turn causes the tips 304 of registration fingers 301 to move down through the slots 305 in outer guide 66, and into the paper path. The fingers 301 are spring-loaded as described in our copending United Kingdom patent application no. 8226812 filed 21 Sept. 1982, to allow them to be lowered onto a sheet of paper passing through the registration nips without damaging it.

As the registration fingers 301 are lowered, the registration pinch rolls 302 are raised. As already described, on energisation of solenoid 317, actuating pin 321 moves in an upward arc. This in turn raises and moves to the right the right hand end of a link 328 on the other side of support 320. The left hand end of link 328 is pivotally mounted on the upper end of a lever 329 that is pivotally mounted on rod 324. Hence lever 329 makes a clockwise angular movement. The lower end of lever 329 is fixed to a generally rectangular resilient support bracket 330 which carries at its upper edge the axle 331 of registration pinch rolls 302. As lever 329 moves clockwise, the rolls 302 are lifted away from the registration drive rolls 303 (FIG. 23) with which they cooperate through the slots 305 in the outer guide 66. The rolls 302 are loaded against the rolls 303 by a spring 332 (FIG. 27). The various linkages are so arranged that in the first part of the movement produced by energisation of solenoid 317, the registration fingers 301 move downwards before the rolls 302 are raised. Conversely, on de-actuation of the solenoid, the rolls 302 are lowered before the registration fingers 301 are raised.

The registration solenoid 317 is energised from a signal initiated by the sensor switch 53 which is actuated by paper moving into the nip rolls 64, 65. The action of registration solenoid 317 on energisation is to move the registration fingers 301 into the paper path and to open the nip between the registration pinch rolls 302 and the drive rolls 303. A spring 333 returns the solenoid 317 to its inactive position and causes the registration mechanism to be reset to close the nip and retract the fingers.

The paper sheet is driven into the registration position, i.e. with its leading edge in contact with the registration fingers 301, by the upper transport rolls 64, 65 and a small buckle is formed in the sheet by means of the buckle inducer 72, 73. A timed signal from the machine logic then deactuates the solenoid 317 which is returned by the spring 333. As the solenoid deactuates, the pinch rolls 302 close onto the paper, and the registration fingers 301 are then raised from the paper path, allowing the paper to be transported to the photoreceptor as soon as the drive rolls 303 are rotated.

Once the paper is being transported by the photoreceptor 11, and then by the pre-fuser transport 19, the solenoid 317 is reactuated for the second sheet. This raises the pinch rolls 302, and lowers the registration fingers 301. However, the latter are arrested by the sheet which is still moving through the registration nip and rest lightly on the moving sheet. As the trail edge of the sheet exits the nip 52, the fingers drop into the gap between that sheet and the next sheet to register the second sheet. This sequence enables the intersheet gap to be reduced to a minimum thus increasing the copy sheet throughput. It will be understood that for a sheet to be acted upon in this way it needs to be longer than the distance between the rolls 302, 303 and the next drive device (vacuum transport 19) since the rolls 302, 303 cannot be separated until the lead edge of the sheet has been picked up by the next transport device.

As has just been explained, the registration arrangement 52 permits the inter-sheet gap to be kept to a minimum. In order to take advantage of this feature the sheet feeders 45 and 46 must be able to feed sheets at closely spaced intervals. This is achieved by means of a wait station associated with each of the feeders which is defined by a wait station sensor. The main tray feeder 46 has a wait station sensor 47 arranged just downstream of the take-away rolls 60, 61 as shown in FIG. 23 and the upper tray feeder 39 has a wait station sensor 48 arranged just upstream of the take-away rolls 68, 69 as also shown in FIG. 23.

During feeding from the main tray sheet feeder the first sheet is fed until the sensor 47 detects the lead edge. The feed clutch stops momentarily and then feeds the sheet clear of the sensor. The sheet feeder remains in operation so that the next sheet follows and it reaches the sensor 47 where it waits until the machine logic calls for the delivery of the next sheet. This system reduces the time between paper feed and registration because the sheet is nearer the registration fingers 301 at the start of a paper feed cycle and because the lead edges of the sheets will always be at the same position at the start of the paper feed cycle.

When the first sheet in a sequence is fed from the upper paper tray unit by the sheet feeder 45 the vacuum belts 252 are driven until the lead edge of the sheet is detected by the sensor 48. After a short delay the vacuum belts 252 are reactivated to move the sheet into the take-away rolls 68, 69 for transportation to the registration fingers 301. The vacuum valve 263 then closes and the belts 252 stop to prevent an early second sheet feed. However, once the first sheet has been taken away the subsequent sheet is immediately acquired and forwarded to the wait station where it awaits the necesary signal from the machine logic to reactivate the vacuum belts to feed it into the nip of take-away rolls 68, 69 for transportation to the registration fingers 301. Thus, in the same way as with the feeder 46 the inter-sheet gap will be uniform and so may be reduced to a minimum without wide variations causing the gap to become too small to permit detection of the gap and the registration fingers to fall into the gap.

In order positively to drive sheets through the transport path, the various nips of the mechanical main tray feeder 46 (belt and roll 202, 203 and feed rolls 60, 61), lower and upper transport rolls 62, 63 and 64, 65 and registration rolls 302, 303 firmly grip the sheets. So as to facilitate the removal of jammed or stalled sheets from the transport a mechanism is provided for automatically disengaging or splitting the drive nips when the front access door of the copier is opened.

The nip splitting mechanism is seen in FIGS. 27 to 30. Opening and closing of the door operates an actuating mechanism 220 which acts on a vertical slider 221 which is movable between a raised position as shown in FIG. 29 in which the nips are closed and a lowered position as shown in FIG. 30 in which the nips are split. In the raised position of the slider 221 a lever 222 on the lower end thereof pushes upwardly against the mounting block 212 so as to pivot the block upwardly about its pivot axis 212*a* and engage the feed roll 60 with the feed roll 61 and the friction retard roll 203 with the retard belt 202. The idler rollers 62 and 64 seat in horizontal slots 223 in the pre-transfer paper path frame 70 and are urged into operative position in engagement with the respective drive rollers 63 and 64 by leaf springs 224 and 225. The registration rolls 302 are as mentioned above loaded against the rolls 303 by a spring 332 which is connected to the pre-transfer paper transport frame as shown in FIG. 27.

As shown in FIG. 28 the slide actuating mechanism 220 includes a cranked arm 226 which is rotated anticlockwise to lift the nip splitter slide 221 when the front door of the copier is closed by means of a knob 227 engaged by the door of the copier when it is closed and which causes a push rod 228 to press against the crank arm 226. To accommodate tolerance variations the push rod 228 is in two parts interconnected by a compression spring 229. A latch 230 is provided on the knob 227 to enable paper feed when the door is open and a special inter-lock tool used by a service engineer is in position for checking the operation of the machine.

When the front door is opened the push rod mechanism 228 retracts and the nip splitter slide 221 moves downwardly under the influence of springs 231 so that the feeder mounting block 212 is lowered separating the friction retard roll 203 from the retard belt 202 and disengaging the feed roll 60 from the feed roll 61, the upward movement of the spring 213 (FIG. 11) being arrested by shoulders 214 on the block 12 as the latter is lowered. At the same time ramps 232 on the slider disengage the idler rolls 62 and 64 from the drive rolls 63 and 65 and an adjustable pin 233 on the upper end of the slider 221 presses down on the rear end of the support bracket 330 to disengage the registration rolls 302 from the drive rolls 303.

Following transfer at the photoreceptor 11, sheets are conveyed by vacuum transport 19 to the fuser 20 through which they are driven by the fuser nip rolls 36, 37. Sheets exiting the fuser are directed by diverter 56 to the output device via the exit nip rolls 54 or to the duplex sheet return path 55 to the buffer storage tray 43. The sheet return path 55 (FIG. 32) includes a first inversion guide 81 by which a simplex sheet being conveyed to the buffer tray is inverted once as its direction of travel is changed to convey it horizontally along the horizontal guide 83 beneath the fuser 20, the horizontal transport 19 and the photoreceptor 11 in the opposite direction to its travel past the photoreceptor and through the fuser. At the end of the horizontal path 83 the sheet enters curved guide 82 which again inverts the sheet and guides it into the buffer tray 43. It will be noted that between the photoreceptor 11 and the buffer tray 43 the sheet is inverted twice so that it enters the buffer tray in the same orientation that it left the photoreceptor. Simplex sheets to be duplex copied are fed out of the buffer tray 38 from left to right as shown in FIG. 1, i.e. in the opposite direction to which they enter the tray and in the same direction in which virgin sheets are fed, and returned by the pre-transfer paper path 50 to the photoreceptor. It will be noted that between the buffer tray 43 and the photoreceptor, the simplex sheet is turned through approximately 180° and this inversion of the sheet causes the blank side of the simplex sheet to be presented to the photoreceptor to receive a second image. It will be understood that with this arrangement the sheets are inverted three times between leaving the photoreceptor and re-passing the photoreceptor during duplex copying. This is achieved without the provision of a special inverter but rather by natural inversion as they are conveyed along the duplex return path 55 and pre-transfer paper path. The double folded configuration of the duplex return path 55 permits a particularly compact arrangement of copier while enabling the paper trays 41, 42, 43 all to be arranged in close array thus simplifying operator access and at the same time permitting a common feeder 45 for the buffer tray 43 and the auxiliary tray 42.

In its passage through the sheet return path 55 each sheet passes through a de-curler mechanism 350 arranged at the beginning of the horizontal guide 83 and is offset laterally as it travels along the horizontal guide 83 by an offsetting mechanism 370.

The diverter 56 is always positioned to divert sheets to the output nip rolls 54 when simplex copying is selected. During duplex copying its position varies according to a predetermined sequence in order to ensure that completed copies exit to the output tray 6 while incomplete copies are conveyed along the sheet return path 55. It is controlled by the machine's microprocessor and actuated by a microswitch 49 triggered by the lead edge of a copy as it enters the fuser. The curved guide 81 of the sheet return path 55 includes inner and outer guide members 84 and 85 and nip rolls 86. The diverter 56 is mounted at the upper end of the outer guide 85 and is operated by a cable 87 from a solenoid 88 mounted lower down on the outer guide 85. The outer guide 85 is hinged to the copier frame for access to the paper path 55.

As the copy passes through the fuser 20 the soft heater roll 36 and the hard pressure roll 37 tend to bend the paper so that it becomes curled with the image side on the outside of the curve. It is important to remove this curl so far as possible from the sheet before it enters the buffer tray so as to avoid handling problems. To this end the sheets conveyed along the return path 55 pass through the sheet de-curler 350 which is arranged at the entrance of the horizontal guide 83. The de-curler 350 comprises of a pair of coating rolls 351, 352 and associated baffle means 253 so positioned relative to the sheet path that a sheet passing through the de-curler mechanism is bent around the lower roll 352 and has induced in it a degree of curl sufficient approximately to offset the opposite curl induced in the fuser.

As best shown in FIGS. 33 and 34 the de-curler mechanism 350 comprises a small radius hard roll 352 such as a metal (steel) shaft engaged by a relatively soft upper roll 351, for example having a compressible rubber surface which is spring loaded into engagement with the lower roll 352 forming a nip 354. The baffle 353 extends downwardly at the downstream side of the nip 354 and is arranged to deflect the sheet downwardly and control the degree of wrap around the lower roll which in turn controls the degree of de-curl. The position of the baffle 353 is adjustable in the feed direction of the sheet, i.e. horizontally as illustrated between for example positions shown in broken and full lines in FIG. 34, for adjusting the degree of paper wrap around the lower roll 352. A suitable adjustment mechanism, illustrated schematically at 355, is provided for this purpose.

It will be understood if the upper roll 351 were continuous the lead edge of the baffle 353 would be positioned adjacent the periphery of the upper roll and particularly where the baffle is adjustable the gap between the roll and the baffle lead edge provides the possibility for sheets passing through the nip 354 to travel over the baffle rather than under it. In order to avoid this possibility the upper roll 351 is made non-continuous by arranging a series of spaced rubber rollers 351 on a steel shaft **351*a* and the baffle is provided with lead-in tangs 356 extending between the rollers. In the embodiment shown these tangs are interconnected on the upstream side of the rollers by a cross-portion 357**.

The lower roll 352 of the de-curler mechanism is suitably a steel shaft having a diameter of about 8 mm while the upper roll 351 suitably comprises a steel shaft **351*a*** having Neoprene rollers about 16 mm in diameter mounted thereon.

The baffle 353 is suitably arranged at an angle of between 25° and 40° to the vertical and the horizontal spacing between the surface of the lower roll 352 and the baffle along the centre line of the roll may be set between 1.0 mm and 10 mm depending upon the angle of the baffle and the weight of the paper. Thus in one embodiment the angle of the baffle may be 33° and the roll to baffle spacing 7.7 mm.

As shown in FIG. 33 the upper roll 351 is mounted on a fixed bracket 358 attached to the copier frame and driven through a gear 359. The lower roll 352 is mounted on a lower support bracket 360 which is pivoted at 361 and urged upwardly by a leaf spring 362 to press the lower roll against the upper roll.

At the exit from the de-curler 350 a post de-curler guide 363 returns the sheet to the horizontal and it will be noted that in order to limit the vertical separation of the sheet path at the opposite sides of the de-curler the input guides 364, 365 at the ends of the guide members 84, 85 direct a sheet upwardly into the de-curler mechanism. Sheets are driven by the de-curler rolls 351, 352 along a horizontal support surface 380 beneath a horizontal transport belt 381 entrained about rollers 382, 383 and a pinch roller 384 within the belt run presses the lower run of the belt against a roller 385 projecting through the support surface 380 to ensure driven engagement between the belt and the sheets.

At the downstream end of the belt 381 is arranged the offsetting mechanism 370. A pair of outrigger rolls 371 are provided on the downstream belt guide roll (383) shaft 386 and engage with a pair of skew rolls 372 which as best seen in FIG. 36 are arranged at an angle to the path of sheet travel. These rolls skew sheets passing therethrough as shown in FIG. 36 and thus have the effect of offsetting the sheets towards the rear of the copier. The degree of skew shown in FIG. 36 is somewhat exaggerated for illustrative purposes and a suitable degree of skew is about 40.

The skewed sheet enters the curved guide 82 and is conveyed into the buffer tray by the corrugating rollers 387 which are located on a casting mounted below the return transport 83. The corrugating rollers 387, which are illustrated in FIG. 37, stiffen the paper and give it sufficient beam strength to be thrown against the backstop 182 of the buffer tray.

The operation of the copier illustrated in FIG. 1 will now be described. Sheets to be copied are placed in turn on the platen 23 and scanned by the optical system 22 to produce an image on the drum 11 which is then developed as described above. Copy sheets may be delivered to the photoreceptor from either the main tray 41 or the auxiliary tray 42 and during simplex copying these sheets are conveyed through the fuser directly into the output tray 6. During duplex copying sheet feed must be from the main tray with the auxiliary tray raised. The first page is placed on a platen 23 and scanned and the required number of copy sheets delivered from the main tray 41. These are conveyed along the sheet return path 55 to the buffer tray 43 where they are temporarily stored. The second page is now placed on the platen and scanned, the copy sheets to receive this image this time being fed from the duplex buffer tray 43 and the duplex copies so produced conveyed out of the copier into the output tray 6. The third page is copied onto blank sheets from the main tray and these are delivered to the buffer tray. Page 4 is copied onto the reverse sides of the page 3 copies and these are conveyed directly to the output tray. This process is continued until all the pages have been copied, it should be noted that if there are an odd number of pages the last page should be copied as a simplex document.

In the embodiment illustrated in FIG. 2 the copier has a semi-automatic document handler 2 and a sorter 3. The semi-automatic document handler 2 is arranged over the platen 23 and permits documents inserted manually on a support 401 at the right-hand side thereof to be fed onto the platen for copying and then fed off the platen into the catch tray 402 at the left-hand side after copying. Manually inserted documents are pre-registered with the aid of a registration device 403 prior to feeding onto the platen. Documents are driven across the platen by a transport belt 404. Exposure of the document may be by driving the document at a constant velocity past the optical system 22 with the latter held stationary in the position shown in full lines in FIG. 2 or by registering the document on the platen and scanning the optical system 22 thereacross. For this purpose a registration member or gate 39, which can be moved in and out of sheet blocking position at the registration edge of the platen by means of a conventional solenoid type actuator, is provided for registering the document in stationary position on the platen 23 while the optical system 22 is scanned across the document. In a preferred form, where multiple copies of a single document sheet are required, the first copy is made in constant velocity mode (stationary optics) as the document is fed onto the platen and subsequent copies are made in scanning mode (moving optics) with the document stationary.

The sorter 3 comprises 15 or 20 bins B arranged in a vertical array. Sheets are fed to the bins B by a generally horizontal transport 411 which extends across the top of the sorter and a vertical transport 412 which extends downwardly past the entrances of the bins. Sheets are deflected into the bins by deflectors or gates G in the manner described in detail in our copending United Kingdom patent application no. 8041083 filed 22 Dec. 1980.

A casual output tray (not shown) may also be provided and in one form this may be arranged immediately above the horizontal transport 411, the casual tray and transport 411 being movable together between a position in which the horizontal transport is aligned with the output nip rolls 54 of the processor and a position in which the tray is aligned with the processor output nip rolls 54 as described more fully in our aforesaid copending UK application no. 8041083.

Simplex copy sheets exiting the processor are directed from the horizontal transport 411 to the vertical transport 412 by a diverter 413. Thus when copying in ascending serial page number order (1 to n), simplex copy sheets directed straight to the bins B are collected face down in serial page number order. However, duplex copies would not be collected in correct page number order for the reasons explained below. For this reason a sheet inverter 414 is incorporated in the sorter. The inverter 414 is a conventional tri-roll inverter arranged alongside the vertical transport 412. The inverter includes a buckle chamber 415 suitably dimensioned to accommodate and buckle 8 inch to $8\frac{1}{2}$ inch wide sheets. With the diverter 413 in the position shown in FIG. 2 sheets are conveyed into the buckle chamber 415 through contra-rotating input and common roll 416 and 417. The sheet trail edge is carried around the surfaces of foam rollers mounted on the common roll (417) shaft and into the nip between the common roll 417 and the output roll 418. The sheet is then guided by another face of the diverter 413, which is generally triangular in shape, into the vertical transport 412. The common roll 417 is driven and the input and output rolls 416, 418 are idlers.

Both simplex and duplex copies are made in the way described above for the machine illustrated in FIG. 1 with the exception that instead of placing the sheets directly onto the platen of the photocopier they are inserted at the right hand side of the semi-automatic document handler 2. Simplex copy sheets are collected in the sorter 3 in conventional manner. However, when copying duplex sheets in serial page number order it will be understood that the sheets exit the copier with the even numbered pages facing upwards. If these are conveyed directly to the sorter bins in the same way as simplex sheets they will be collected in the order, taken from bottom to top of the stack: 2/1, 4/3, 6/5 etc. In order to achieve the desired serial page number order in the duplex copies they are passed through the inverter 413.

In the embodiment shown in FIG. 3 a recirculation document handler 4 is provided for feeding documents to be copied to the platen 23 of the photocopier. The document handler includes a storage tray 431 for the documents to be copied and document circulating means for delivering the documents in turn to the platen from the storage tray and for returning the documents to the tray, whereby the documents may be circulated and recirculated in sequence past the platen 23 for repeated copying (precollation mode). The documents may either be transported across the platen at a constant velocity past the optical system 22 of the photocopier which is held stationary in the solid line position shown, or instead they may be registered on the platen by registration gate 35 prior to copying and the stationary document exposed by scanning the optical system 22 across the document as described above. When the document is registerd on the platen, the document handler can be operated in so-called stacks mode wherein each document is copied a plural number of times during a single delivery to the platen.

The document handler 4 comprises, in addition to the storage tray 431, a document separator/feeder 432, a pre-platen transport 433 for conveying documents to the platen, a platen transport 434 and a post-platen transport 435 by which documents are returned to the storage tray.

The document storage tray 431 is mounted over the platen 23 and slopes upwardly towards the separator/-feeder 432; it is adjustable to accommodate different document sizes.

Sheet separation and acquisition is accomplished by a vacuum belt corrugation feeder (VCF) 432 using flotation pressure differences between the bottom sheet and the sheets above, sheet corrugation and vacuum, a parabolic contour packet being cut out at the lead edge of the tray 431 and dished down in the manner shown and described in U.S. Pat. No. 4,275,877. Documents placed in the tray 431 bridge this gap and form a flotation pocket. Transport belt 436 surface through the document tray within the contour pocket. Document stack flotation is accomplished by a frontal assault of air from an air knife 437. The air jet impinges on the tray just in front of the lead edge of the document stack; this permits volumetric flow expansion of air within the pocket contour of the tray and also riffles the front edge of the documents to allow a differential pocket of air between the bottom sheet and sheet 2. This assists in the acquisition, separation and feeding of the bottom document.

A set counter mechanism (not shown) is mounted at the back of the tray 431 and has a counter arm projecting into the tray so that it can overlie the document(s) in the tray. The arm is pivoted so that as the last document is fed it falls through a slot in the floor of the tray and actuates a sensor. The arm is then returned to the top of the document stack.

The pre-platen and post-platen transports 433, 435 consist of pairs of nip rolls and inner and outer inversion guides as shown and the platen transport 435 comprises a single white, wide friction drive belt 438 entrained over input and output transport rollers 439. The document is transported across the platen 23 by the belt 438. Three gravity rolls 441 apply a nip between the belt 438 and platen 23 and maintain drive across the platen.

For inverting documents during circulation to make duplex-to-duplex or duplex-to-simplex copies, a tri-roll inverter 440 is incorporated in the document handler in the post-platen transport 435. The post-platen transport 435 has a diverter 422. Documents may either be directed through the normal simplex path direct to nip rolls 443 or to the nip betweeen input (444) and common (445) rolls of the tri-roll inverter 440. The inverter 440 also includes a curved buckle chamber 446 dimensioned to accommodate and buckle 8" to 8½" wide sheets. Because of the curved shape of the buckle chamber, the sheet trail edge is carried around the surface of foam rollers mounted on the common roll (445) shaft and into the nip between the common roll 445 and output roll 447. The sheet is then guided over the diverter 442 into the nip rolls 443. The common roll 445 is driven and the input and output rolls 444, 447 are idlers.

The document handler 4 may be operated either in pre-collation (or sets) mode in which the pages of a document are copied one at a time in serial number order or in post-collation (or stacks) mode in which multiple copies of each document sheet are made before the next document sheet is copied.

For making copies from duplex original documents, the documents are inverted during each circulation.

The finisher 5, which is described in more detail in our copending UK patent application no. 8226819 filed 21 Sept. 1982, includes an offsetting catch tray or output tray 460 and may be operated to perform the following functions:

(a) to compile, register and corner staple sets of copies as they are produced and transport the stapled sets into the offsetting catch tray 460, and (b) to deliver copies direct to the offsetting catch tray 460 where the sheets may be compiled in offset sets.

In a variation of (a) the stapling step may be omitted.

The finisher 5 receives copy sheets from the processor at input nip 465 and conveys them to the offsetting catch tray 460 either directly along a path 461 or, via a compiler tray 462 in which they are registered and stapled, along a path 463. The direction of the sheets is determined by a diverter 464 located directly following the finisher input nip rolls 465*a*, 465*b* and which is operated in response to a signal from the procesor initiated by the operator.

The path 463 comprises upper and lower guides 463*a*, 463*b* and includes two further sets of nip rolls 467, 468 which accelerate the sheets into the compiler tray 462. The sheets are corner registered against a retractable end registration gate 469 and a side registration gate 470 at the front of the machine by gravity and a paddle wheel 471, represented in FIG. 3 by a broken ellipse. Sets compiled in the tray 462 are corner stapled by a stapler 472. Stapled sets are driven from the tray 462 by retracting the gate 469 and lifting the set against a pair of driven eject rolls 473 by means of a pair of idler rolls 474 mounted on one end of pivoted arm 475 which carries the gate 469 at its other end.

Thus the sheets are conveyed into the compiler tray in a first direction (from right to left in FIG. 3) and their trail edges registered by being conveyed against the end registration gate 469 in the opposite direction (from left to right in FIG. 1). The path 463 extends over the paddle wheel 471 and the eject rolls 473 and the sheets drop by gravity towards the end registration gate 470 since the tray 462 slopes downwardly in that direction suitably at an angle of about 40 degrees.

The sets are carried into the offsetting catch tray 460, which is arranged beneath the compiler tray 462, around a large driven, rigid sun roll 476 with the aid of three driven, compliant planet rolls 477, 478, 479 and outer guides 480, 481. Thus as the sets are conveyed to the offsetting catch tray 460 they are inverted and their direction reversed. The catch tray 460 itself slopes downwardly in the same direction as the compiler tray 462 suitably at about 40 degrees.

In sets copying mode, a document set to be copied is placed face up in the document handler tray 431 with original document n at the bottom so that the pages of the document are copied in reverse order. Thus, copy sheets are delivered to the complier tray of the finisher in the order n−1. In simplex copying, sheets are received face-up at the output so that the assembled set is in page number order and are fed through the copier long edge first so that the top of the page is at the front side of the machine. Accordingly the top left-hand corner of the set is arranged in the registration corner and is stapled. Thus sets stapled in the compiler tray 462 are received face-down in the catch tray 460 with the stapled corner at the upper front of the tray.

Sheets which do not need to be stapled may be fed directly to the catch tray 460. Thus, where stapling is not required sheets are directed along path 462 into engagement with the roller 476 and driven into the tray 460 with the aid of driven foam rolls 478, 479. The tray 460 may be offset sideways between sets to provide visual and physical separation between the sets.

In addition to making single sided copies from single sided originals the copier shown in FIG. 3 may be used to make double sided (duplex) copies from single sided (simplex) or double sided (duplex) originals and to make single sided (simplex) copies from double sided (duplex) originals. In all cases the originals to be copied are placed face up in the document tray of the recirculation document handler with page 1 at the top of the stack. The originals are copied in the order n to 1 and the copies, which may be formed on copy sheets delivered from either the main tray or the auxiliary tray (simplex copying only), are delivered at the output of the processor face-up so as to be formed into a stack with page n at the bottom of the stack. When making simplex copies from two-sided originals, the originals are passed through the inverter following each exposure. As will be seen from FIG. 38 when the original duplex originals are placed face up in the document tray the even sides are on the undersides of the originals so that during the first circulation the odd sides will be face down on the platen. In order that the even sides will be copied before the odd sides so as to ensure the correct pagination of copies at the exit from the processor, the originals are circulated through the inverter in a non-copying circulation before the first copying circulation. Following the last copying circulation there is a further non-copying circulation to reorient the originals in the original page order. The set counter is shown at 450 in FIG. 38.

When making two-sided or duplex copies from single sided or simplex originals it is necessary to count the number of originals before commencing to copy. This is because the originals are copied in reverse serial number order (n to 1) and depending whether there is an odd or even number of originals, the final page must either be on the obverse of a simplex copy sheet or on the reverse of a duplex copy sheet. Counting of the number of original documents is achieved by slewing the original documents through the document handler in a non-copying circulation, the set counter indicating when all the documents have been fed.

Figure 39:
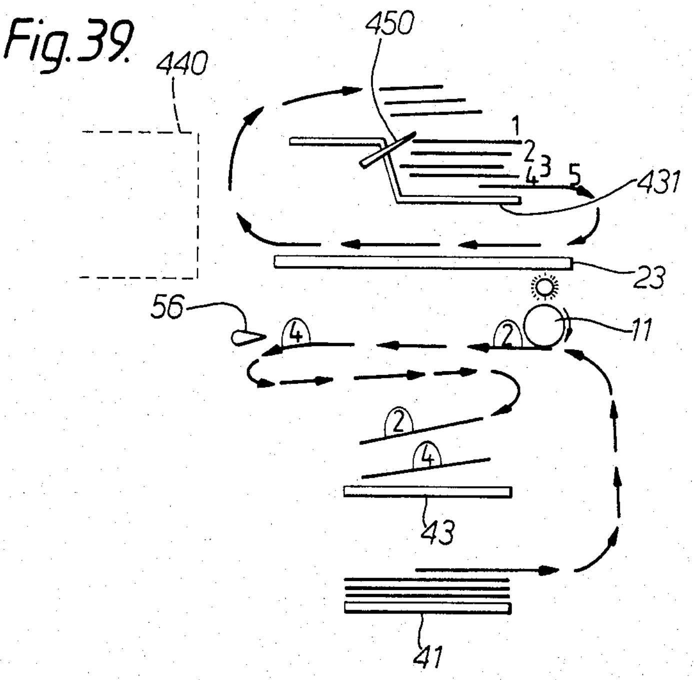

The copying of an odd number of simplex original documents to make duplex copies will now be described with reference to FIGS. 39 to 41. For the purposes of illustration it will be assumed that there are five original documents. During a first copying circulation as shown in FIG. 39 only the even numbered originals are copied and these are delivered to the buffer tray 43.

Assuming that more than one set of copies is required, during the next circulation all the originals are copied as shown in FIG. 40. The last sheet (sheet 5) is copied on a blank sheet from the main tray and directed immediately to the output tray where it is received face-up. Page 4 is also copied onto a blank sheet from the main tray and is sent to the buffer tray. Page 3 is copied onto the other side of the page 4 simplex copy delivered to the buffer tray during the previous circulation and this duplex copy is delivered to the output with side 3 facing upwards. Page 2 is copied onto a blank sheet from the main tray and delivered to the buffer tray and side 1 is copied onto the other face of the page 2 simplex copy received in the buffer tray during the previous circulation and delivered to the output with side 1 up. The cycle is performed a number of times equal to the number of sets required minus one.

In order to complete the last set during a final cycle only the odd pages are copied as in FIG. 41. Thus page 5 is copied onto a blank sheet and directed immediately to the output tray, page 3 is copied onto the other side of the page 4 simplex copy delivered to the buffer tray in the previous circulation and likewise page 1 is copied onto the other side of the page 2 simplex copy from the previous circulation, and both these duplex copies are delivered to the output tray.

It will be understood that if only a single set is required then only the first and final circulations are required.

It will also be understood that if there are an even number of original documents then all the copies will be produced as duplex copies and the making of a simplex copy of the last page as in the odd number set does not apply.

For making two-sided or duplex copies from two-sided or duplex originals the originals are first slewed through a non-copying inversion cycle through the inverter and during a first copying cycle the even sides are copied onto blank sheets form the main tray which are delivered to the buffer tray as shown in FIG. 42. During this circulation the original documents are again inverted and during a second circulation as shown in FIG. 43 the odd pages are copied on to the blank sides of the even simplex copies which are delivered from the duplex tray, the duplex copies so produced being delivered to the output of the processor with the odd pages facing upwards and in serial page number order from top to bottom of the stack. Subsequent sets are produced by repeating these two circulations for each set. Following the last circulation the documents are returned to the document tray without passing through the inverter so that they are in proper page serial number order for removal by the operator.

Although specific embodiments of the invention have been described hereinabove it will be realised that various modifications may be made to the specific details referred to without departing from the scope of the invention as defined in the appended claims.

For example, the scanning system 22 may scan from left to right in FIGS. 1 to 3 so that for constant velocity transport it is parked at the end-of-scan rather than start-of-scan position.

What is claimed is:

1. In a copier capable of simplex or duplex copying, including a photoreceptor, first and second copy sheet trays, means for feeding copy sheets from said first and second copy sheet trays to said photoreceptor, and a duplex buffer tray, and further including, for said duplex copying, simplexed sheet recirculation means for conveying simplexed copy sheets, which have received an image on only one side at said photoreceptor, to said duplex buffer tray and for refeeding said simplexed copy sheets back from said duplex buffer tray to said photoreceptor to receive a second image on the other sides thereof, the improvement wherein said means for feeding copy sheets comprises a first sheet feeder associated only with said first copy sheet tray and a second sheet feeder commonly associated with both said duplex buffer tray and said second copy sheet tray, and wherein said second copy sheet tray is mounted for movement between a lowered, operative, position in which it is seated within said duplex buffer tray and operatively associated with said second, common, sheet feeder only for simplex copying, and a raised, inoperative, position in which said second copy sheet tray is spaced over said duplex buffer tray and only said duplex buffer tray is operatively associated with said second common, sheet feeder, and wherein said second copy sheet tray is maintained in said raised, inoperative, position during said duplex copying.

2. A copier according to claim 1, in which said first copy sheet tray is movable between an operative position operationally engaged with said first sheet feeder and an inoperative position disengaged from said first sheet feeder, and said first copy sheet tray is maintained in said operative position during duplex copying.

3. A copier according to claim 2, including control means for inhibiting engagement of said first copy sheet tray with said first copy sheet feeder until said second copy sheet tray is disengaged from said second, common, feeder.

* * * * *